United States Patent
Noland

(10) Patent No.: US 12,220,754 B2
(45) Date of Patent: Feb. 11, 2025

(54) ROTARY CUTTING TOOL WITH CONTINUOUS MAJOR FLUTES AND DISCONTINUOUS MINOR FLUTES INTERSECTING TO FORM QUADRILATERAL-SHAPED FACE PORTIONS

(71) Applicant: SECO TOOLS AB, Fagersta (SE)

(72) Inventor: Dennis Noland, Brockway, PA (US)

(73) Assignee: SECO TOOLS AB, Fagersta (SE)

( * ) Notice: Subject to any disclaimer, the term of this patent is extended or adjusted under 35 U.S.C. 154(b) by 344 days.

(21) Appl. No.: 17/915,709

(22) PCT Filed: Mar. 18, 2021

(86) PCT No.: PCT/EP2021/056968
§ 371 (c)(1),
(2) Date: Sep. 29, 2022

(87) PCT Pub. No.: WO2021/197863
PCT Pub. Date: Oct. 7, 2021

(65) Prior Publication Data
US 2023/0130145 A1    Apr. 27, 2023

Related U.S. Application Data

(60) Provisional application No. 63/003,931, filed on Apr. 2, 2020.

(51) Int. Cl.
*B23B 5/10* (2006.01)
*B23C 5/10* (2006.01)

(52) U.S. Cl.
CPC .............. *B23C 5/1009* (2013.01); *B23C 5/10* (2013.01); *B23C 2210/0492* (2013.01);
(Continued)

(58) Field of Classification Search
CPC .............. B23C 5/10; B23C 2210/0492; B23C 2210/241; B23C 2210/287;
(Continued)

(56) References Cited

U.S. PATENT DOCUMENTS 2,855,657 A * 10/1958 Erhardt ..................... B23C 5/04
407/115
4,721,421 A * 1/1988 Klinger ..................... B23C 5/10
407/54
(Continued)

FOREIGN PATENT DOCUMENTS

CN   109648125 A    4/2019
JP   2015205360 A   11/2015

*Primary Examiner* — Nicole N Ramos
(74) *Attorney, Agent, or Firm* — Corinne R. Gorski

(57) ABSTRACT

Rotary cutting tool (100) having plurality of major flutes (130) arranged helically opposite to plurality of discontinuous minor flutes (135) and intersecting to form plurality of teeth. Each tooth includes a first cutting edge formed with the major flute and a second cutting edge formed with the minor flute, the first and second cutting edges meeting at an apex and form part of a periphery of a quadrilateral-shaped face portion. The face portion has non-planar surfaces extending from the respective first and second cutting edges that define a relief surface of each cutting edge. First and second cutting edges are arranged on an imaginary cylinder having a center axis coaxial with the axis of rotation of the tool and respective relief surfaces are radially inward of a surface of the imaginary cylinder such that the first and second cutting edges each have a clearance in a rotational direction of the tool.

18 Claims, 11 Drawing Sheets

(52) U.S. Cl.
CPC .... *B23C 2210/32* (2013.01); *B23C 2210/326* (2013.01); *B23C 2226/27* (2013.01)

(58) Field of Classification Search
CPC .......... B23C 2210/326; B23C 2210/32; B23C 2210/323; B23C 2226/27; B23C 2260/80; B23C 2200/164; B23C 2200/205
See application file for complete search history.

(56) References Cited

U.S. PATENT DOCUMENTS

| | | | | |
|---|---|---|---|---|
| 7,232,311 | B1* | 6/2007 | Greggs | A61C 3/02 |
| | | | | 433/165 |
| 7,959,381 | B2* | 6/2011 | Kienzle | B23G 5/182 |
| | | | | 407/54 |
| 9,174,287 | B2 | 11/2015 | Shpigelman et al. | |
| 10,272,504 | B2* | 4/2019 | Dodds | B23P 15/34 |
| 2005/0123363 | A1* | 6/2005 | Ahrnkiel | B23C 5/10 |
| | | | | 407/53 |
| 2010/0310329 | A1* | 12/2010 | Harif | B23C 5/08 |
| | | | | 408/1 R |
| 2014/0100574 | A1 | 4/2014 | Bono et al. | |
| 2015/0147127 | A1* | 5/2015 | Shpigelman | B23C 5/10 |
| | | | | 407/54 |
| 2016/0221094 | A1* | 8/2016 | Wang | B23C 5/10 |
| 2019/0366453 | A1* | 12/2019 | Huijs | B23C 5/10 |

* cited by examiner

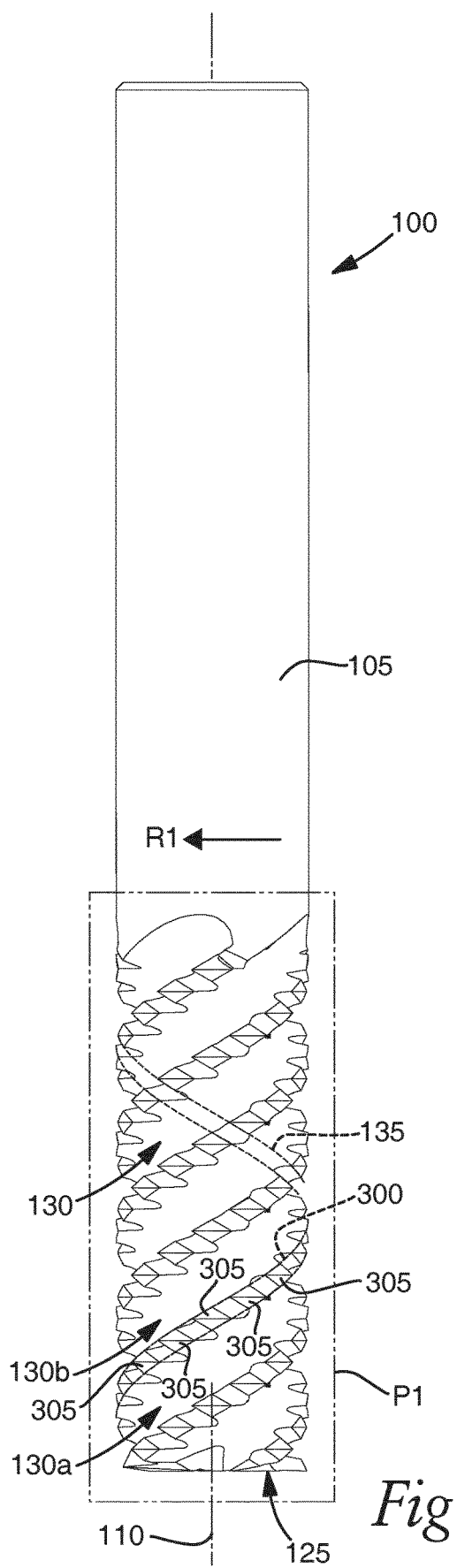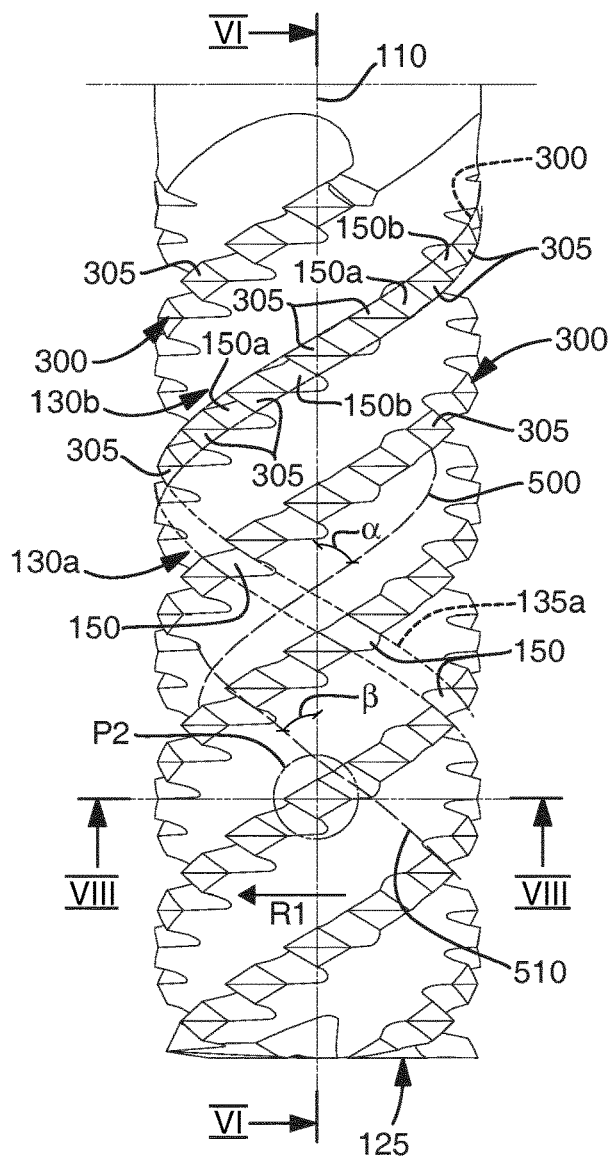
Fig 3
Fig 4

ROTARY CUTTING TOOL WITH CONTINUOUS MAJOR FLUTES AND DISCONTINUOUS MINOR FLUTES INTERSECTING TO FORM QUADRILATERAL-SHAPED FACE PORTIONS

RELATED APPLICATION DATA

This application is a § 371 National Stage Application of PCT International Application No. PCT/EP2021/056968 filed Mar. 18, 2021, with priority to U.S. Provisional Application No. 63/003,931 filed Apr. 2, 2020.

FIELD OF THE DISCLOSURE

The present disclosure is directed to a cutting tool and more particularly to a rotary cutting tool, such as an end mill, for machining of a workpiece, in which the flute system and the tooth geometry of the cutting tool have been engineered for improved machining, especially of fiber composite materials. The rotary cutting tool has a plurality of continuous major flutes arranged helically opposite to a plurality of discontinuous minor flutes, the two flute types intersecting to form teeth having a first cutting edge formed with the major flute and a second cutting edge formed with the minor flute that meet at an apex and form part of a periphery of a quadrilateral-shaped face portion of the tooth. A surface of the face portion extending from a respective first and second cutting edge defines a relief surface for the respective cutting edge that is radially inward from a surface of an imaginary cylinder containing the cutting edges, which ensures that there is no surface contact between the face portion and the workpiece during machining with the tool. The cutting edges and the relief surfaces improve cutting dynamics, particularly when machining fiber composite material. The disclosure also relates to a method to manufacture such a rotary cutting tool.

BACKGROUND

In the discussion that follows, reference is made to certain structures and/or methods. However, the following references should not be construed as an admission that these structures and/or methods constitute prior art. Applicant expressly reserves the right to demonstrate that such structures and/or methods do not qualify as prior art against the present invention.

Composite materials can provide performance advantages in various applications, primarily due to characteristics such as reduction in weight and increased flexibility. However, composite materials can also be more difficult to machine than other materials, such as metals or woods. Common composite materials are typically composed of layers of fibers and resins bonded together with intense heat and/or pressure. Machining composite materials requires getting through these different layers of various material types by, for example, chipping, ripping or shredding. Each of these layers react differently when cut and the heat generated by the cutting tool can cause delamination or other failure modes if not machined properly and can lead to excessive tool wear.

Common problems when machining composites include, for example, delamination of composite layers, uncut fibers, fiber tear-out, uneven tool wear, and poor surface finish. These problems are caused by conditions created by the composite materials themselves, and can be difficult to correct. The simple fact of cutting a combination of multiple materials at the same time introduces many factors that make it difficult to strike the right balance of the proper tool for the job and appropriate running parameters. Additionally, when machining with conventional rotary cutting tools, non-point or linear contact between the cutting edge and the fiber composite material can result in fiber pullout, delamination and other failures causing a ragged cutting edge are avoided.

Several types of conventional cutting tools are known for use in machining composite materials. For example, straight flute composite cutters are designed to prevent delamination of layered materials by applying all cutting forces radially, eliminating axial forces from a typical helical cutting edge. Cutting action can be improved with a high positive rake angle for shearing fibers and incorporation of an eccentric relief for improved edge life.

Another example is compression cutters, which consist of an up cut and down cut helix. The top portion of the length of cut has right-hand cutting teeth with a left-hand spiral while the lower portion of the length of cut has right-hand cutting teeth with a right-hand spiral. This geometry creates opposing cutting forces that can stabilize the material removal process when cutting layered composites and can prevent delamination, fiber pullout, and burs along the surface. Compression of the top and bottom of the workpiece can keep the layer bonded together.

Other examples include specialized geometries, such as cutting tools with notch-like chipbreakers, in which all the flutes are oriented in the same direction and which shears fibers and shortens chips for improved material evacuation, and diamond cut composite cutters, which have a combination of left-hand and right-hand teeth with a downcut geometry on the outside diameter but are traditionally understood to result in a poorer surface finish. Also, a composite finishing cutting tool, with increased contact points resulting from a slow helix and high flute count, can be used for finish machining. Examples of conventional cutting tools for composite materials are shown and described at https://www.harveyperformance.com/in-the-loupe/tooling-machining-composites/, the contents of which are incorporated herein by reference.

Even with the above conventional tool types available for machining composite materials, there remains a need for further improvement in cutting tool design to further optimize performance for machining of composite materials, as well as to minimize or prevent fiber pullout, delamination and other failure modes that can cause a ragged cutting edge in finished workpieces.

SUMMARY

The disclosed rotary cutting tool has a flute system and a tooth geometry in which (in the direction of machining rotation of the tool) an apex of two cutting edges is a leading point of contact with the workpiece during machining, i.e., a cutting point, and each cutting edge has a true/effective relief surface that ensures there is no surface contact between the face portion and the workpiece during use of the tool. Thus, the disclosed rotary cutting tool minimizes fiber pullout, delamination and other failures causing a ragged cutting edge that can occur by the non-point or linear contact between the cutting edge and the fiber composite material observed in conventional rotary cutting tools.

In general, the disclosed rotary cutting tool has a plurality of continuous major flutes arranged helically opposite to a plurality of discontinuous minor flutes. Teeth are formed by the intersection of the continuous major flutes and discontinuous minor flutes and each tooth includes a first cutting edge formed with the major flute and a second cutting edge formed with the minor flute. The first and second cutting edges meet at an apex and form part of a periphery of a quadrilateral-shaped face portion of the tooth, with the surfaces of the face portion extending from the respective first and second cutting edges defining relief surfaces for the respective cutting edge that are radially inward from a surface of an imaginary cylinder containing the cutting edges, which ensures that there is no surface contact between the face portion and the workpiece during machining with the tool. The apex is the point of first contact with the workpiece during machining, followed by the cutting edges, and initially places the workpiece material in compression during a penetration phase of machining, i.e., the period when the apex and trailing cutting edges penetrate into the workpiece. Upon further rotation of the tool, the apex passes the point of maximum penetration depth into the workpiece and rotational motion of the tool results in the apex (and trailing cutting edges) being withdrawn from the workpiece. During this withdrawal phase, the fibers in the fiber composite material are in tension and the cutting mode is in shear. Shearing of the fibers of the fiber composite material has been shown to reduce pullout and other failures that can result in ragged cutting edges and, therefore, the disclosed rotary cutting tool produces an improved finish on the cutting surface of the workpiece.

An embodiment of the disclosed rotary cutting tool comprises a tool body comprising a longitudinal center axis of rotation, the tool body being elongated and rotatable along the longitudinal center axis of rotation; a fluted cutting end portion and a shank portion that is axially opposite the fluted cutting end portion, the fluted cutting end portion comprising a radial periphery surface and an end surface; a plurality of major flutes located in the fluted cutting end portion, each major flute including a major flute surface projecting radially inward into the tool body and extending continuously and helically in an axial direction of the tool body; and a plurality of minor flutes located in the fluted cutting end portion, each minor flute including a minor flute surface projecting radially inward into the tool body and having a plurality of discontinuous minor flute surface portions that collectively extend helically in the axial direction of the tool body. Two sequentially adjacent major flutes are separated from each other by a plurality of teeth arranged in a band and individual teeth of the plurality of teeth in the band are separated from each other by a first discontinuous minor flute surface portion of a first minor flute and a second discontinuous minor flute surface portion of a second minor flute, the first minor flute sequentially adjacent the second minor flute. The radial periphery surface of each tooth of the plurality of teeth arranged in the band defines a face portion and the face portion has a periphery including a first side edge and a second side edge meeting to form an apex that is oriented with the two side edges opening opposite to a direction of cutting rotation of the rotary cutting tool. The first side edge of the face portion is formed by an intersection of the face portion with the flute surface of a first major flute, the first side edge defining a first cutting edge, and the second side edge of the face portion is formed by an intersection of the face portion with the first discontinuous minor flute surface portion of the first minor flute, the second side edge defining a second cutting edge. Also, a first region of the face portion extending from the first cutting edge toward an interior region of the face portion is non-planar and defines a relief surface of the first cutting edge, and a second region of the face portion extending from the second cutting edge toward the interior region of the face portion is non-planar and defines a relief surface of the second cutting edge.

One embodiment of the disclosed rotary cutting tool comprises a tool body comprising a longitudinal center axis of rotation, the tool body being elongated and rotatable along the longitudinal center axis of rotation; a fluted cutting end portion and a shank portion that is axially opposite the fluted cutting end portion, the fluted cutting end portion comprising a radial periphery surface and an end surface; a plurality of right-hand flutes located in the fluted cutting end portion, each right-hand flute including a flute surface projecting radially inward into the tool body and extending helically in an axial direction of the tool body; and a plurality of left-hand flutes located in the fluted cutting end portion, each left-hand flute including a flute surface projecting radially inward into the tool body and extending in the axial direction of the tool body. The flute surface of each of the plurality of right-hand flutes is continuous along at least a majority of a helical length of the right-hand flute and the flute surface of each of the plurality of left-hand flutes is discontinuous along at least a majority of a helical length of the left-hand flute. Two sequentially adjacent right-hand flutes are separated from each other by a plurality of teeth arranged in a band and individual teeth of the plurality of teeth in the band are separated from each other by a portion of one of the plurality of left-hand flutes. The radial periphery surface of each tooth of the plurality of teeth arranged in the band defines a face portion, the face portion having a periphery including four side edges, wherein a first set of two opposing side edges of the face portion are formed by an intersection of the face portion with the flute surfaces of the two sequentially adjacent right-hand flutes and a second set of two opposing edges of the face portion are formed by an intersection of the face portion with the flute surfaces of two sequentially adjacent left-hand flutes. A first opposing edge of the first set intersects a first opposing edge of the second set to form a leading apex of the tooth, the first opposing edge of the first set defining a right-handed cutting edge, the first opposing edge of the second set defining a left-handed cutting edge, and the leading apex of the tooth defining a cutting point. A second opposing edge of the first set intersects a second opposing edge of the second set to form a trailing apex of the tooth. A region of the face portion extending from the right-handed cutting edge to an imaginary line extending from the leading apex of the tooth to the trailing apex of the tooth defines a relief surface of the right-handed cutting edge and a region of the face portion extending from the left-handed cutting edge to the imaginary line extending from the leading apex of the tooth to the trailing apex of the tooth defines a relief surface of the left-handed cutting edge, wherein the relief surface of the right-handed cutting edge is non-planar and the relief surface of the right-handed cutting edge is non-planar. The non-planar relief surface of the right-handed cutting edge intersects the non-planar relief surface of the left-handed cutting edge at the imaginary line extending from the leading apex of the tooth to the trailing apex of the tooth to form an angle therebetween.

Another embodiment of the disclosed rotary cutting tool comprises a tool body comprising a longitudinal center axis of rotation, the tool body being elongated and rotatable along the longitudinal center axis of rotation; a fluted cutting end portion and a shank portion that is axially opposite the fluted cutting end portion, the fluted cutting end portion comprising a radial periphery surface and an end surface; a plurality of right-hand flutes located in the fluted cutting end portion, each right-hand flute including a flute surface projecting radially inward into the tool body and extending continuously and right-helically in an axial direction of the tool body; and a plurality of left-hand flutes located in the fluted cutting end portion, each left-hand flute including a flute surface projecting radially inward into the tool body and having a plurality of discontinuous flute surface portions that collectively extend left-helically in the axial direction of the tool body. Two sequentially adjacent right-hand flutes are separated from each other by a plurality of teeth arranged in a band and individual teeth of the plurality of teeth in the band are separated from each other by a first discontinuous flute surface portion of a first left-hand flute and a second discontinuous flute surface portion of a second left-hand flute, the first left-hand flute sequentially adjacent the second left-hand flute. The radial periphery surface of each tooth of the plurality of teeth arranged in the band defines a face portion, the face portion having a periphery including a first side edge and a second side edge meeting to form an apex, the apex oriented with the two side edges opening opposite to a direction of cutting rotation of the rotary cutting tool. The first side edge of the face portion is formed by an intersection of the face portion with the flute surface of a first right-hand flute, the first side edge defining a right-handed cutting edge, and the second side edge of the face portion is formed by an intersection of the face portion with the first discontinuous flute surface portion of the first left-hand flute, the second side edge defining a left-handed cutting edge. A first region of the face portion extending from the right-handed cutting edge toward an interior region of the face portion is non-planar and defines a relief surface of the right-handed cutting edge, and a second region of the face portion extending from the left-handed cutting edge toward the interior region of the face portion is non-planar and defines a relief surface of the left-handed cutting edge, wherein the relief surface of the right-handed cutting edge and the relief surface of the left-handed cutting edge are not coplanar and meet at a transition feature.

Embodiments of the disclosed rotary cutting tool can be utilized to remove material from a workpiece by, for example, rotating the rotary cutting tool when mounted to a spindle of an apparatus for machining and removing material from the workpiece by contacting the first cutting edge and the second cutting edge to the workpiece. Example workpieces are fiber reinforced composite, such as carbon fiber reinforced plastic (CRFP) or a glass fiber reinforced plastic (GFRP).

Embodiments of the disclosed rotary cutting tool can be manufactured by, for example, a method comprising forming a tool body comprising a longitudinal center axis of rotation, the tool body being elongated and rotatable along the longitudinal center axis of rotation, forming a plurality of major flutes and a plurality of minor flutes in a fluted cutting end portion of the tool body, each major flute including a major flute surface projecting radially inward into the tool body and extending continuously and helically in an axial direction of the tool body and each minor flute including a minor flute surface projecting radially inward into the tool body and having a plurality of discontinuous flute surface portions that collectively extend helically in the axial direction of the tool body, wherein two sequentially adjacent major flutes are separated from each other by a plurality of teeth arranged in a band and individual teeth of the plurality of teeth in the band are separated from each other by a first discontinuous minor flute surface of a first minor flute and a second discontinuous minor flute surface of a second minor flute, the first minor flute sequentially adjacent the second minor flute, and forming a surface profile on a radial periphery surface of each tooth of the plurality of teeth arranged in the band, wherein the surface profile defines a face portion having a periphery including a first side edge and a second side edge meeting to form an apex, the apex oriented with the two side edges opening opposite to a direction of cutting rotation of the rotary cutting tool. The first side edge of the face portion is formed by an intersection of the face portion with the flute surface of a first major flute, the first side edge defining a first cutting edge, and the second side edge of the face portion is formed by an intersection of the face portion with the first discontinuous minor flute surface of the of the first minor flute, the second side edge defining a second cutting edge. A first region of the face portion extending from the first cutting edge toward an interior region of the face portion is non-planar and defines a relief surface of the first cutting edge, and a second region of the face portion extending from the second cutting edge toward the interior region of the face portion is non-planar and defines a relief surface of the second cutting edge.

Additional aspects, features and advantages will be set forth in the description that follows, and in part will be apparent from the description, or may be learned by practice of the invention. The objectives and other advantages of the disclosed rotary cutting tool will be realized and attained by the structure particularly pointed out in the written description and claims thereof as well as the appended drawings. However, other systems, methods, features and advantages will be, or will become, apparent to one with skill in the art upon examination of the following figures and detailed description, and it is intended that all such additional systems, methods, features and advantages be included within this description, be within the scope of the present disclosure, and be protected by the following claims. Nothing in this section should be taken as a limitation on those claims. It is to be understood that both the foregoing general description and the following detailed description of the disclosed cutting tool are examples and explanatory, and are intended to provide further explanation of the disclosed cutting tool as claimed.

BRIEF DESCRIPTION OF THE DRAWINGS

The accompanying drawings, which are included to provide a further understanding of the invention and are incorporated in and constitute a part of this specification, illustrate implementations of the invention and together with the description serve to explain the principles of the disclosure.

FIG. 3 is a side plan view of the rotary cutting tool having continuous right-hand major flutes and discontinuous left-hand minor flutes.

FIG. 4 is a magnified plan side view of the fluted cutting end portion P1 shown in FIG. 3.

Figure 1A:
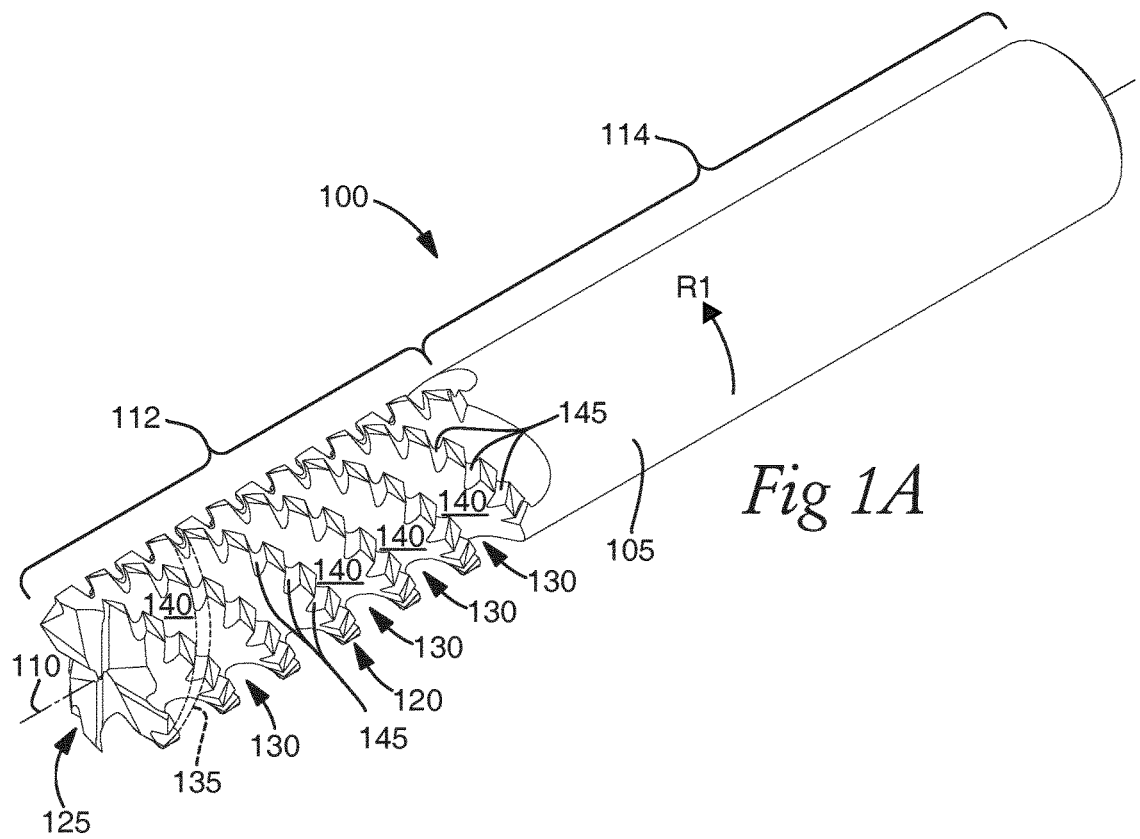
FIGS. 1A and 1B are isometric views from two different angles of a rotary cutting tool in accordance with an embodiment of the disclosed cutting tool having continuous major flutes in a right-hand configuration and discontinuous minor flutes in a left-hand configuration.

Note, for ease of viewing, not all instances of the features shown in the figures are labeled with reference numerals.

Throughout the drawings and the detailed description, unless otherwise described, the same drawing reference numerals should be understood to refer to the same elements, features, and structures, unless context dictates otherwise. The relative size and depiction of these elements may be exaggerated for clarity, illustration, and convenience. Furthermore, in some instances, reference numerals have not been applied to each instance of each feature in a particular figure so as to reduce the complexity of the reference numeral labeling and also to improve the overall comprehension of the information conveyed in the figures. In such instances, the identity of non-labeled features can be readily understood from the description and the other reference numerals.

DETAILED DESCRIPTION

In the following detailed description, reference is made to the accompanying drawings, which form a part hereof. In the drawings, the use of similar or the same symbols in different drawings typically indicates similar or identical items, unless context dictates otherwise. The illustrative embodiments described in the detailed description, drawings, and claims are not meant to be limiting. Other embodiments may be utilized, and other changes may be made, without departing from the spirit or scope of the subject matter presented here. The progression of processing steps and/or operations described is an example; however, the sequence of steps and/or operations is not limited to that set forth herein and may be changed as is known in the art, with the exception of steps and/or operations necessarily occurring in a certain order.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

The present application uses formal outline headings for clarity of presentation. However, it is to be understood that the outline headings are for presentation purposes, and that different types of subject matter may be discussed throughout the application (e.g., device(s)/structure(s) may be described under device(s)/structure(s) heading(s) and/or process(es)/operations may be discussed under structure(s)/process(es) headings; and/or descriptions of single topics may span two or more topic headings). Hence, the use of the formal outline headings is not intended to be in any way limiting.

Aspects, features and advantages of the disclosed rotary cutting tool can be embodied in rotary cutting tools in which the continuous major flutes are right-handed and the discontinuous minor flutes are left-handed or in rotary cutting tools in which the continuous major flutes are left-handed and the discontinuous minor flutes are right-handed. Regardless of handedness, the major flute provides chip evacuation and is for material removal and the intersecting orientation of the major flutes and minor flutes create the cutting edges of the rotary cutting tool. While the following description will concentrate on an embodiment in which the continuous major flutes are right-handed and the discontinuous minor flutes are left-handed, it will be understood that corresponding aspects, features, functions, and advantages disclosed with respect to rotary cutting tools with continuous right-handed major flutes and discontinuous left-handed minor flutes can be embodied in rotary cutting tools with continuous left-handed major flutes are and discontinuous right-handed minor flutes.

Figure 1B:
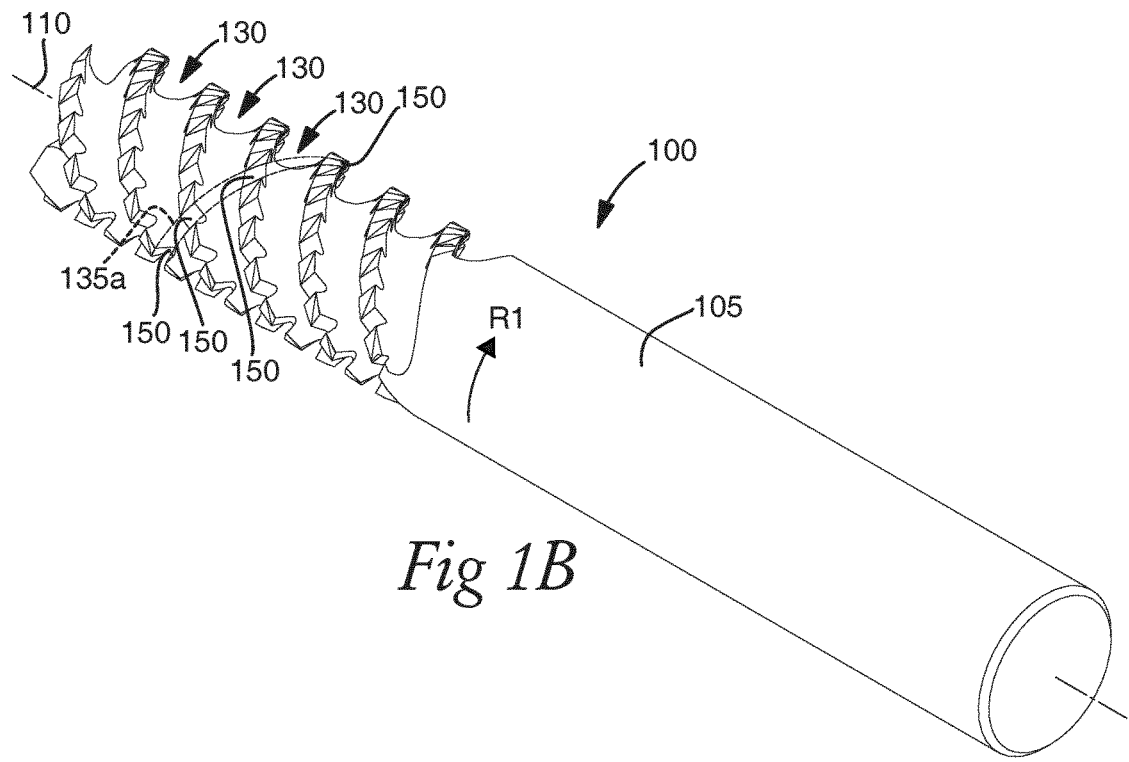

FIGS. 1A and 1B are isometric views from two different angles of a rotary cutting tool in accordance with an embodiment of the disclosed cutting tool having continuous major flutes in a right-hand configuration and discontinuous minor flutes in a left-hand configuration. The rotary cutting tool 100 includes a tool body 105 that is elongated and rotatable (R1) along a longitudinal center axis of rotation 110. The tool body 110 can optionally have one of a cylindrical shape, a conical shape, or a contoured shape. The rotary cutting tool 100 has a fluted cutting end portion 112 and a shank portion 114. The shank portion 114 is axially opposite the fluted cutting end portion 112 (relative to the longitudinal center axis of rotation 110). The fluted cutting end portion 112 comprises a radial periphery surface 120 and an end surface 125. In some embodiments, the peripheral surface 120 extends axially rearward from the end surface 125 along the direction of the longitudinal center axis of rotation 110 to a location along the tool body 100 where the fluted cutting end portion 112 transforms directly into the shank portion 114. In other embodiments, one or more intermediate portions are interposed between the fluted cutting end portion 112 and the shank portion 114. At an axially opposite end of the tool 100 from the end surface 125, the shank portion 114 may optionally have a means for attaching the rotary cutting tool 100 (for example, via a chuck or a clamping device) to an apparatus for machining, such as a machine tool or a computer numerical control (CNC) machine.

A plurality of major flutes 130 and a plurality of minor flutes 135 are located in the fluted cutting end portion 112. Each major flute 130 includes a major flute surface 140 that projects radially inward (relative to the longitudinal center axis of rotation 110) into the tool body 105 and extends continuously and helically in an axial direction (relative to the longitudinal center axis of rotation 110) of the tool body 105. In some embodiments, the major flute surface 140 is continuous along at least a portion, for example a majority portion, of the helical length of the major flute 130. In other embodiments, the major flute surface 140 is continuous along the entire helical length of the major flute 130. Each minor flute 135 includes a minor flute surface 145 that projects radially inward (relative to the longitudinal center axis of rotation 110) into the tool body 105. A plurality of discontinuous minor flute surface portions 150 collectively form the minor flute surface 145 and, in any one minor flute 135, collectively extend helically in the axial direction of the tool body 105. For ease of viewing and as an example, minor flute 135 is identified by dashed lines connecting the discontinuous minor flute surface portions 150 of one minor flute surface 135a. In some embodiments, the minor flute surface 145 is discontinuous along at least a portion, for example a majority portion, of the helical length of the minor flute 135. In other embodiments, the minor flute surface 145 is continuous along the entire helical length of the minor flute 135.

The number of major flutes 130 and number of minor flutes 135 in a rotary cutting tool 100 can vary. In exemplary embodiments, the total number of major flutes 130 in the plurality of major flutes is 2 to 6, alternatively 4, and the total number of minor flutes 135 in the plurality of minor flutes is 4 to 12, alternatively 8. In some aspects, the total number of major flutes 130 is less than the total number of minor flutes 135. In other aspects, the total number of major flutes 130 is the same as the total number of minor flutes 135.

The example embodiment shown in FIGS. 1A and 1B is a right-handed tool (meaning, when viewed from the end surface 125 along the longitudinal center axis of rotation 110, the tool 100 is rotated counter-clockwise in order to cut (indicated by direction R1 in FIGS. 1A and 1B)), but other embodiments can be a left-handed tool (as discussed further herein).

Figure 2A:
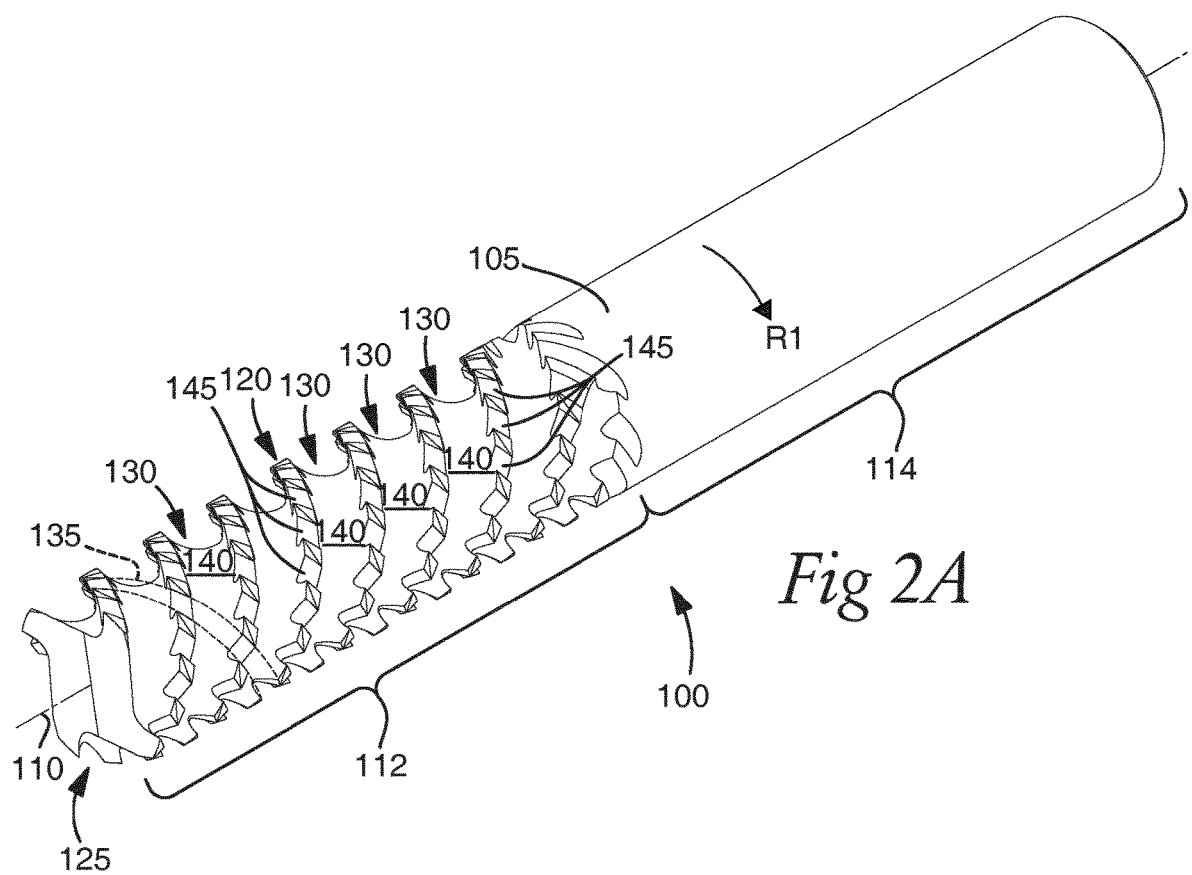
FIGS. 2A and 2B are isometric views from two different angles of a rotary cutting tool in accordance with another embodiment of the disclosed cutting tool having continuous major flutes in a left-hand configuration and discontinuous minor flutes in a right-hand configuration.
Figure 2B:
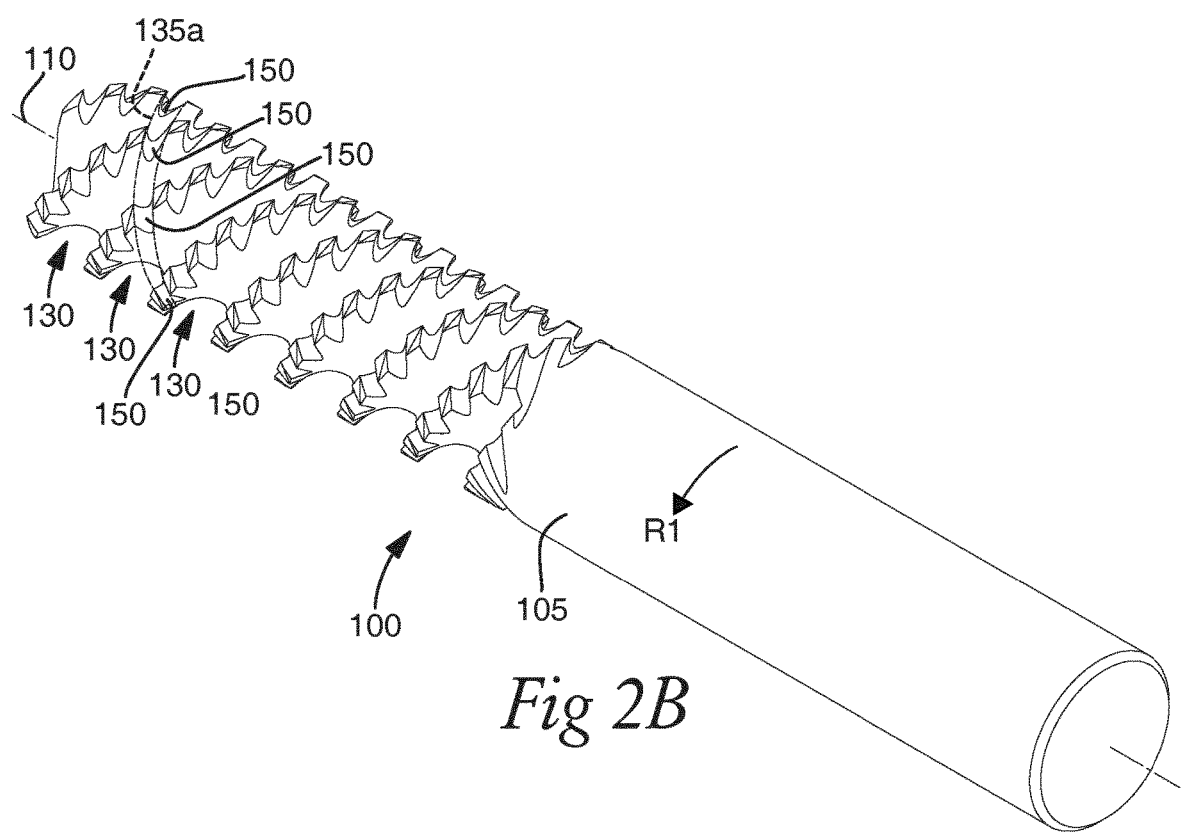

FIGS. 2A and 2B are isometric views from two different angles of a rotary cutting tool in accordance with another embodiment of the disclosed cutting tool having continuous major flutes in a left-hand configuration and discontinuous minor flutes in a right-hand configuration. The features, geometry, function and advantages of the rotary cutting tool 200 in FIGS. 2A and 2B correspond to similar features, geometry and function of the rotary cutting tool 100 in FIGS. 1A and 1B, except for the different handedness of the major and minor flutes and the attendant different direction of rotation for machining. Thus, the rotary cutting tool 200 includes a tool body 205 that is elongated and rotatable (R2) along a longitudinal center axis of rotation 210. The rotary cutting tool 200 has a fluted cutting end portion 212 and a shank portion 214. The shank portion 214 is axially opposite the fluted cutting end portion 212 (relative to the longitudinal center axis of rotation 210). The fluted cutting end portion 212 comprises a radial periphery surface 220 and an end surface 225. In some embodiments, the peripheral surface 220 extends axially rearward from the end surface 225 along the direction of the longitudinal center axis of rotation 210 to a location along the tool body 200 where the fluted cutting end portion 212 transforms directly into the shank portion 214. In other embodiments, one or more intermediate portions are interposed between the fluted cutting end portion 212 and the shank portion 214. A plurality of major flutes 230 and a plurality of minor flutes 235 are located in the fluted cutting end portion 212. Each major flute 230 includes a major flute surface 240 that projects radially inward (relative to the longitudinal center axis of rotation 210) into the tool body 205 and extends continuously and helically in an axial direction (relative to the longitudinal center axis of rotation 210) of the tool body 205. Each minor flute 235 includes a minor flute surface 245 that projects radially inward (relative to the longitudinal center axis of rotation 210) into the tool body 205. The minor flute surface 245 includes a plurality of discontinuous flute surface portions 250 that collectively form the minor flute surface 245 and, in any one minor flute 235, collectively extend helically in the axial direction of the tool body 205.

FIG. 3 is a side plan view of the rotary cutting tool 100 having continuous right-hand major flutes 130 and discontinuous left-hand minor flutes 135 and FIG. 4 is a magnified side plan view of the fluted cutting end portion P1 shown in FIG. 3. In FIGS. 3 and 4, two sequentially adjacent major flutes, such as major flutes 130a and 130b, are separated from each other by a plurality of teeth 305 arranged in a band 300. For ease of viewing and as an example, band 300a of teeth 305 is identified by dashed lines connecting the teeth 305 of one band 300a. Individual teeth 305 of the plurality of teeth 305 in the band 300 are separated from each other by a first discontinuous minor flute surface portion 150a of a first minor flute 135 and a second discontinuous minor flute surface portion 150b of a second minor flute 135 (the first minor flute 135 being sequentially adjacent the second minor flute 135).

Figure 5:
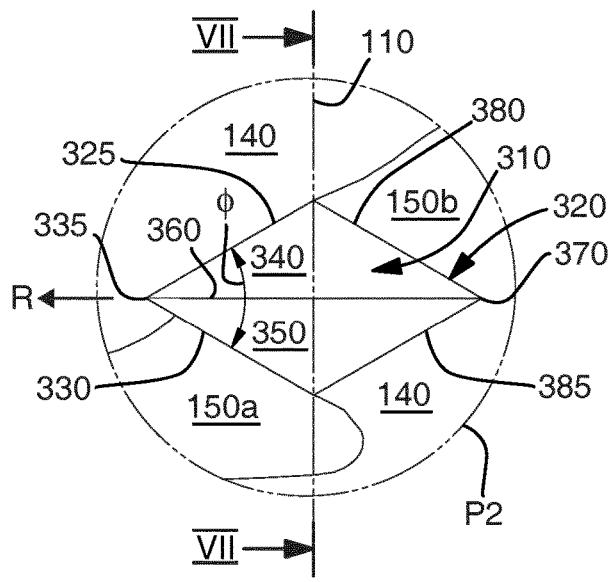
FIG. 5 is a magnified plan view of a portion of a band of teeth shown in portion P2 in FIG. 4.

FIG. 5 is a magnified plan view of a portion of a band of teeth shown in portion P2 in FIG. 4. In FIG. 5, the radial periphery surface of the tooth 305 is shown. Also shown in FIG. 5 are regions of the cutting tool 100 that are immediately adjacent the tooth 305, including major flute surfaces 140 (from two sequential continuous right-hand major flutes 130) and a first discontinuous minor flute surface portion 150a of a first minor flute 135 and a second discontinuous minor flute surface portion 150b of a second minor flute 135 (the first minor flute 135 being sequentially adjacent the second minor flute 135). The radial periphery surface of the tooth defines a face portion 310, which has a periphery 320. The periphery 320 includes a first side edge 325 that is formed by an intersection of the face portion 310 with the flute surface 140 of a first major flute 130. The first side edge 325 defines a first cutting edge. The periphery 320 also includes a second side edge 330 that is formed by an intersection of the face portion 310 with the discontinuous minor flute surface portion 150a of a minor flute 135. The second side edge 330 defines a second cutting edge. The first side edge 325 and the second side edge 330 meet to form an apex 335 that is oriented with the two side edges 325, 330 opening opposite to a direction of cutting rotation (R1) of the rotary cutting tool 100. In view of this arrangement, the apex 335 is a leading edge (in the direction of cutting rotation R1 of the rotary cutting tool) during cutting.

The handedness of the cutting edges depends on the handedness of the rotary cutting tool. For example, in a right-handed rotary cutting tool the first side edge defines a right-handed cutting edge and the second side edge defines a left-handed cutting edge. Also for example, in a left-handed rotary cutting tool the first side edge defines a left-handed cutting edge and the second side edge defines a right-handed cutting edge.

A first region 340 of the face portion 310 extends from the first cutting edge (defined by first side edge 325) toward an interior region of the face portion 310. A second region 350 of the face portion 310 extends from the second cutting edge (defined by second side edge 330) toward the interior region of the face portion. Both the first region 340 and the second region 350 are each non-planar and each defines a relief surface of their respective cutting edge, i.e., the first region 340 defines a relief surface of the first cutting edge and the second region 350 defines a relief surface of the second cutting edge.

Figure 6:
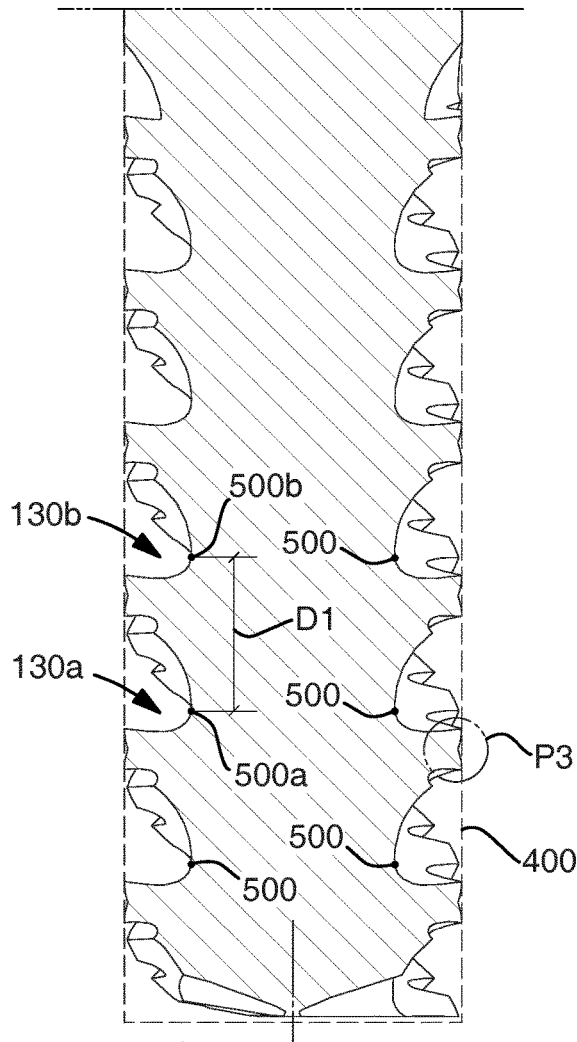
FIG. 6 is a cross-section of the fluted cutting end portion shown in FIG. 4 taken along section VI-VI.
Figure 7:
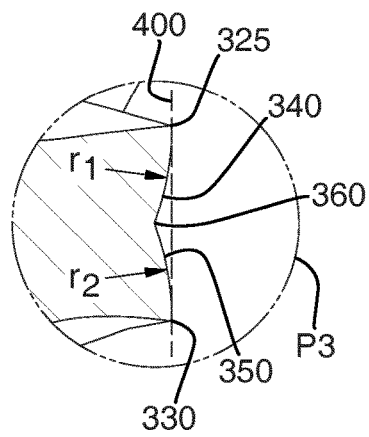
FIG. 7 is a magnified view of portion P3 in FIG. 6.

FIG. 6 is a cross-section of the fluted cutting end portion shown in FIG. 4 taken along section VI-VI and FIG. 7 is a magnified view of portion P3 in FIG. 6. The cross-section in FIG. 6 is in a plane parallel to and containing the longitudinal center axis of rotation 110. It is also noted that FIG. 7 equates to a cross-section of the tooth in portion P2 in FIG. 4 taken along section VI-VI and a cross-section of the tooth in FIG. 5 taken along section VII-VII. FIG. 7 further illustrates the shape of the first region 340 and the second region 350 that function as relief surfaces for the first cutting edge (defined by first side edge 325) and the second cutting edge (defined by second side edge 330). As seen in FIG. 7, both the first region 340 and the second region 350 are each non-planar. In some aspects, the first region 340 (defining the relief surface of the first cutting edge) includes a curved surface having a first radius (r1). In other aspects, the second region 350 (defining the relief surface of the second cutting edge) includes a curved surface having a second radius (r2). In one embodiment, both the first region 340 (defining the relief surface of the first cutting edge) includes a curved surface having a first radius (r1) and the second region 350 (defining the relief surface of the second cutting edge) includes a curved surface having a second radius (r2) and the length of the first radius (r1) and the length of the second radius (r2) are the same. In a second embodiment, both the first region 340 (defining the relief surface of the first cutting edge) includes a curved surface having a first radius (r1) and the second region 350 (defining the relief surface of the second cutting edge) includes a curved surface having a second radius (r2) and the length of the first radius (r1) and the length of the second radius (r2) are different.

In other alternative embodiments, the shape of the first region 340 and the second region 350 can be convex or have varying or more than one convexity. For example, in some embodiments, the first region 340 (defining the relief surface of the first cutting edge) includes a surface having more than one convex region. In other embodiments, the second region 350 (defining the relief surface of the second cutting edge) includes a surface having more than one convex region. The convexities associated with the first region 340 and the second region 350 can, as between the two regions, be the same or be different. Further, these convexities can be simple, such as being a curve associated with a circle or an oval or a parabola, or can be complex, such as being associated with a third degree (or higher order) polynomial function.

In still other alternative embodiments, the shapes of the first region 340 and the second region 350 can vary from curved or can be a series of short, connected planar surfaces approximating a curve.

The relief surface of the first cutting edge and the relief surface of the second cutting edge meet at a transition feature 360. The transition feature 360 can be a feature formed by the meeting of the two non-coplanar relief surfaces 340, 350, such as a line, which can be visible as a line or be an imaginary line that results from the meeting of the two non-coplanar relief surfaces. As such, the feature can be formed by the angle between the two non-coplanar relief surfaces 340, 350. Alternatively, the transition feature 360 can be a radiused surface joining the angled, two non-coplanar relief surfaces 340, 350. In another alternative, the transition feature 360 can be a planar surface, such as land, joining the angled, two non-coplanar relief surfaces 340, 350 and the transition from the planar surface to each of the angled, two non-coplanar relief surfaces 340, 350 can itself by angled or radiused.

FIG. 5 illustrates the transition feature 360 as a straight line, but the relief feature 360 can have alternative forms, such as a curved line, or a saw tooth pattern. Additionally, as illustrated in FIG. 5, the relief feature bisects the apex angle ($\phi$). However, in other embodiments the transition feature 360 is non-bisecting and can be oriented (over its length extending from the apex 335) closer to the first cutting edge (defined by first side edge 325) or closer to the second cutting edge (defined by second side edge 330). In exemplary embodiments the apex angle ($\phi$) has a value of equal to or greater than 40 degrees and equal to or less than 90 degrees, alternatively equal to or greater than 45 degrees and equal to or less than 70 degrees or equal to or greater than 55 degrees and equal to or less than 65 degrees or equal to 60±1 degrees.

In exemplary embodiments, the first cutting edge (defined by first side edge 325) and the second cutting edge (defined by second side edge 330) and the apex 335 are located on a surface of an imaginary cylinder 400 having a center axis that coincides with the longitudinal center axis of rotation 110. The first cutting edge (defined by first side edge 325) and the second cutting edge (defined by second side edge 330) being located on a surface of an imaginary cylinder 400 can be seen from FIGS. 6 and 7. As seen in FIGS. 6 and 7, the first cutting edge (defined by first side edge 325) is coincident to and is located on the surface of imaginary cylinder 400. Similarly, the second cutting edge (defined by second side edge 330) is coincident to and is located on the surface of imaginary cylinder 400. In one aspect, the first region 340 (defining the relief surface of the first cutting edge) and the second region 350 (defining the relief surface of the second cutting edge) is radially inward (relative to the longitudinal center axis of rotation 110) of the surface of the imaginary cylinder 400. In such an arrangement, a trailing apex 370 may be coincident to and be located on the surface of imaginary cylinder 400 (see trailing apex 370 in FIG. 8 located on imaginary cylinder 400). In other aspects, all other portions of the face portion 310, i.e., all portions besides the first cutting edge (defined by first side edge 325), the second cutting edge (defined by second side edge 330) and the apex 335, are radially inward (relative to the longitudinal center axis of rotation 110) of the surface of the imaginary cylinder 400. In this aspect, the "all other portions" include the trailing apex 370 and the other portions of the periphery 320 of the face portion 310, such as (for a quadrilateral-shaped face portions 310 as shown in FIG. 5) trailing first side edge 380 and trailing second side edge 385.

In both aspects, these surfaces radially inward of the of the imaginary cylinder 400 provide a clearance for the first cutting edge and the second cutting edge in the direction of cutting rotation (R) of the rotary cutting tool 100.

As seen in FIG. 5, the periphery 320 of the face portion 310 has a shape of a quadrilateral. In some embodiments, the quadrilateral is a parallelogram, while in other embodiments, the quadrilateral is a rhombus.

Figure 8:
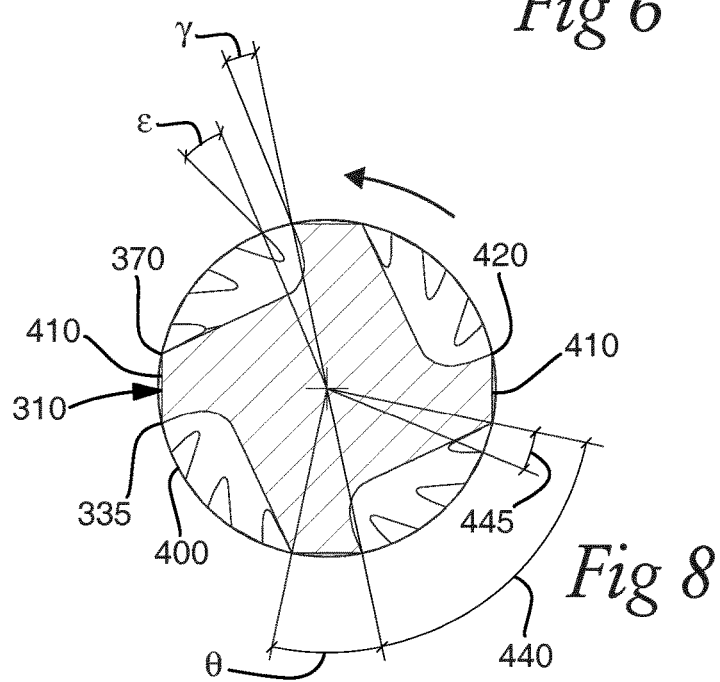
FIG. 8 is a cross-section of the fluted cutting end portion shown in FIG. 4 taken along section VIII-VIII.

Returning to FIG. 8, which is a cross-section of the fluted cutting end portion shown in FIG. 4 taken along section VIII-VIII, the spatial relationship between the periphery 320 of the face portion 310 and the surface of the imaginary cylinder 400. The view in FIG. 8 shows a cross-section in a plane perpendicular to the longitudinal center axis of rotation 110 and intersecting at least one tooth 305 of the plurality of teeth arranged in the band 300. In this view, an intersection between the plane and the face portion 310 forms a chord 410 with a circumference of the imaginary cylinder 400. The chord 410 has endpoints 415 and 420. An arc (θ) of the circumference of the imaginary cylinder 400 between endpoints 415, 420 of the chord 410 is equal to or greater than 30 degrees and equal to or less than 45 degrees, alternatively, equal to or greater than 30 degrees and equal to or less than 35 degrees or 31±1 degrees.

Also with reference to FIG. 8, one can observe both the major flute 130 and minor flutes 135. In the cross-section in FIG. 8, one readily observes that an arc length 440 of the major flutes 130 is greater than an arc length 445 of the minor flutes 135. In one aspect, multiple minor flutes can be seen through the opening of the major flute, visually confirming that the an arc length 440 of the major flutes 130 is greater than an arc length 445 of the minor flutes 135. In one aspect, the arc length 445 of the minor flutes 135 is greater than (0.5×arc length 440 of the major flutes 130). In another aspect, the arc length 440 of the major flutes 130 is a non-integer multiple of the arc length 445 of the minor flutes 135 and the non-integer multiple is greater than 1 and less than 5, alternatively greater than 1 and less than 4 or greater than 1 and less than 3.

Further with reference to the cross-section shown in FIG. 8, one can observe the radial rake angle associated with each of the major flute 130 and the minor flute 135. The radial rake angles are the angle made by the rake face of the flute and a radius measured in a plane normal to the longitudinal center axis of rotation 110. As shown in FIG. 8, each major flute 130 has a positive radial rake angle (γ) and each minor flute 135 has a positive radial rake angle (ε). In exemplary embodiments, the positive radial rake angle (γ) of 9°≤γ≤11°, alternatively γ=10° and the positive radial rake angle (ε) is 9°≤ε≤11°, alternatively ε=10°.

Overall, in exemplary embodiments of the rotary cutting tool, each band 300 of teeth 305 has a geometry that is identical in at least some aspects and, in some embodiments, are identical in all aspects. In some aspects, at least every tooth 305 in one of the plurality of bands 300 has an identical geometry, but the geometry of teeth 305 in one band 300 may vary from the geometry of teeth 305 in a second band 300. In other aspects, at least every tooth 305 in one of the plurality of bands 300 has an identical geometry, but the geometry of teeth 305 in one band 300 may vary from the geometry of teeth 305 in a second band 300. In still other aspects, the face portion 310 of every tooth 305 in one of the plurality of bands 300 has an identical geometry.

Both the major flute 130 and the minor flute 135 have helical centerlines, which are imaginary lines located at the most radially inward surface of the respective flute. FIG. 4 is annotated with an example of a helical centerline 500 of a major flute 130 and a helical centerline 510 of a minor flute 135 and FIG. 6 is annotated with the location of the most radially inward surface of a major flute 130 at which the helical centerline 500 is located. The helical centerlines are representative of the helical geometry of the respective flute and the angle formed between the helical centerline and an imaginary plane containing the longitudinal center axis of rotation 110 represents a helix angle of the flute. For example, the angle formed between the helical centerline 500 of the major flute 130 and the imaginary plane containing the longitudinal center axis of rotation 110 represents a helix angle (α) of the major flute 130 and the angle formed between the helical centerline 510 of the minor flute 135 and the imaginary plane containing the longitudinal center axis of rotation 110 represents a helix angle (β) of the minor flute 135. In exemplary embodiments, the helix angle (α) of each major flute 130 has an absolute value of 45°≤|α|≤70°, alternatively 59°≤|α|≤61°, and the helix angle (β) of each minor flute 135 has an absolute value of 45°≤|β|≤70°, alternatively 59°≤|β|≤61°. In one aspect, the absolute value of the helix angle (α) of each major flute 130 and the absolute value of the helix angle (β) of each minor flute 135 are the same. In another aspect, the absolute value of the helix angle (α) of each major flute 130 and the absolute value of the helix angle (β) of each minor flute 135 are different.

In additional embodiments, the helical centerline 500 of each of two major flutes 130 that are sequentially adjacent are at a constant separation distance along a longitudinal length of the fluted cutting end portion 112. FIG. 6 is annotated to show an example of the separation distance D1 between the helical centerlines 500a, 500b of two sequentially adjacent major flutes 130a, 130b. In exemplary embodiments, the separation distance D1 is a function of the tool diameter, the spiral lead, and the number of major flutes.

Figure 9:
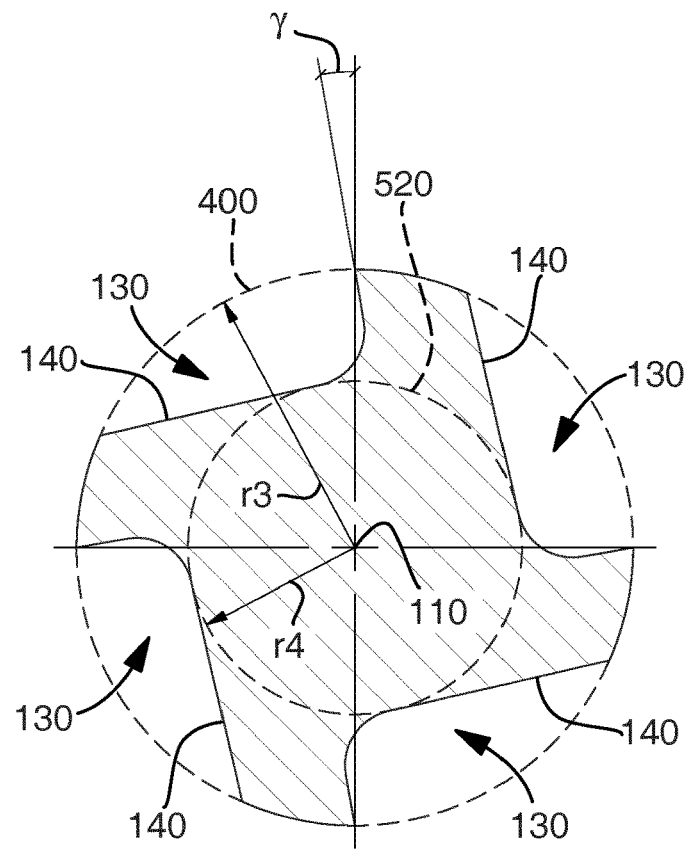
FIG. 9 is a cross-section of the fluted cutting end portion in a plane perpendicular to the longitudinal center axis of rotation showing features of the major flute.

FIG. 9 is a cross-section of the fluted cutting end portion 112 in a plane perpendicular to the longitudinal center axis of rotation 110 showing features of the major flute 130. FIG. 9 schematically illustrates the distribution of major flutes 130 around the circumference of the tool as well as the cross-sectional shape of the major flute surfaces 140. The tool has a first core diameter, which is defined by the imaginary circle 520 centered on the longitudinal center axis of rotation 110 and having a circumference connecting the most radially inward surface of the major flutes 130, i.e., the location on the major flute surface 140 at which the helical centerline 500 is located. The difference between the length of the radius (r3) of the surface of the imaginary cylinder 400 and the length of the radius (r4) of the first core defines a radial depth of the major flute 130.

Figure 10:
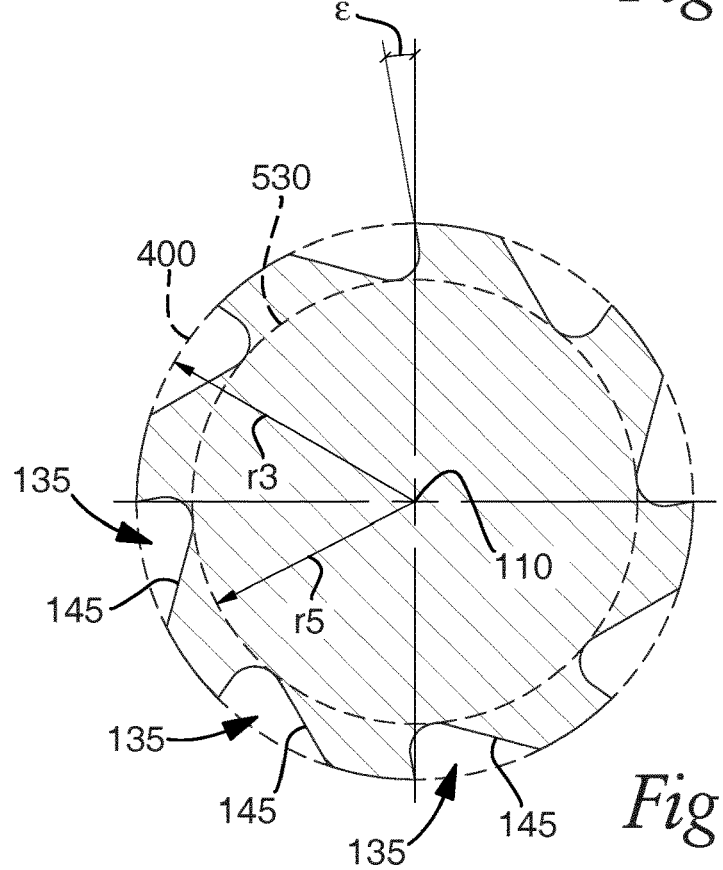
FIG. 10 is a cross-section of the fluted cutting end portion in a plane perpendicular to the longitudinal center axis of rotation showing features of the minor flute.

FIG. 10 is a cross-section of the fluted cutting end portion 112 in a plane perpendicular to the longitudinal center axis of rotation 110 showing features of the minor flute 135. FIG. 10 schematically illustrates the distribution of minor flutes 135 around the circumference of the tool as well as the cross-sectional shape of the minor flute surfaces 145. The tool has a second core diameter, which is defined by the imaginary circle 530 centered on the longitudinal center axis of rotation 110 and having a circumference connecting the most radially inward surface of the minor flutes 135, i.e., the location on the minor flute surface 140 at which the helical centerline 510 is located. The difference between the length of the radius (r3) of the surface of the imaginary cylinder 400 and the length of the radius (r5) of the second core defines a radial depth of the minor flute 135.

In exemplary embodiments, the value for r4 is 60% of the value of r3 and the value of r5 is 80% of the value of r3.

In one aspect of the rotary cutting tool 100, the major flutes 130 have a first core diameter that is less than the second core diameter of the minor flutes 135. In other words, the length of the radius (r4) of the first core of the major flute 130 is less than the length of the radius (r5) of the second core of the minor flutes 135. In another aspect of the rotary cutting tool 100, the radial depth of the major flutes 130 is greater than the radial depth of the minor flutes 135.

Also seen in FIGS. 9 and 10 are the positive radial rake angle (γ) of the major flute 130 and the positive radial rake angle (ε) of the minor flute 135.

Figure 11:
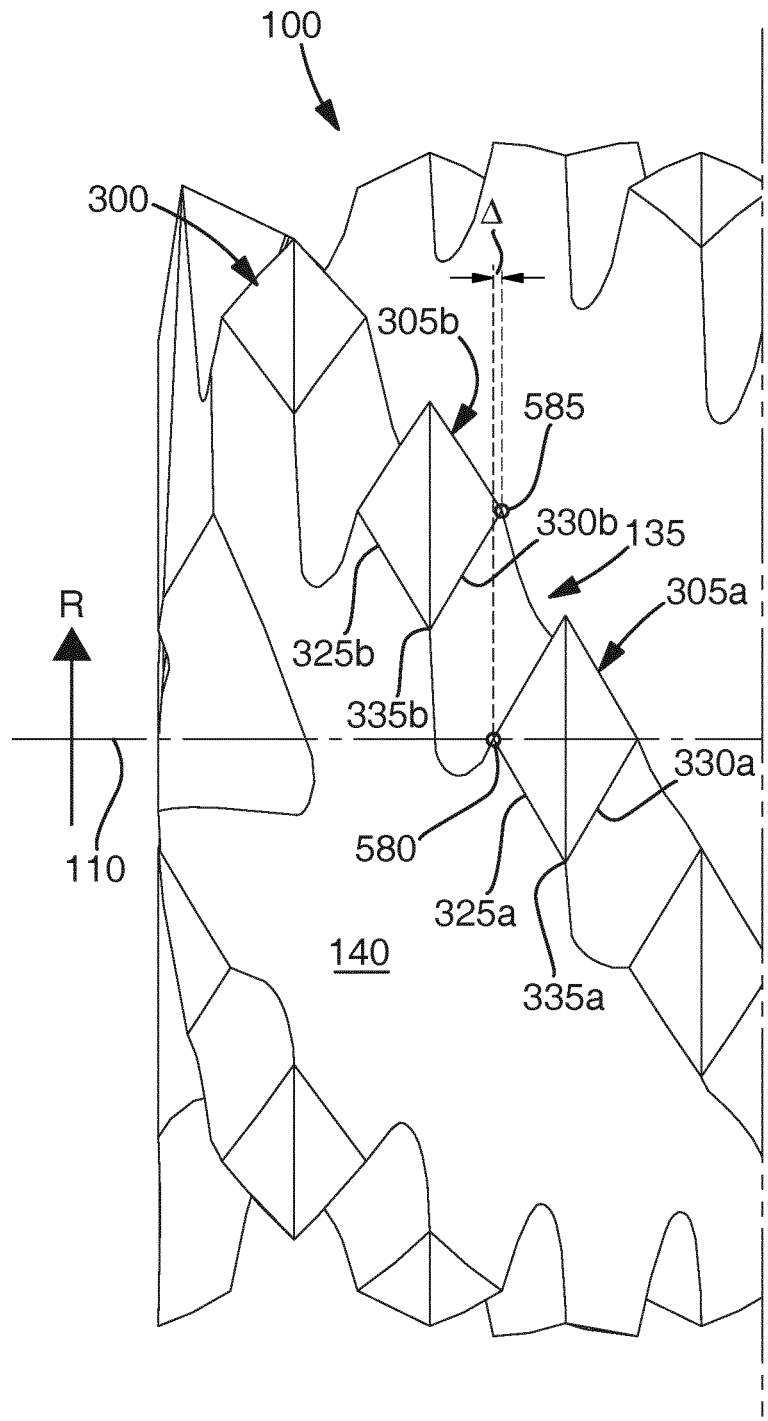
FIG. 11 is a magnified isometric, perspective view of a portion of the fluted cutting end portion of a rotary cutting tool and showing the relationship of the cutting edges on two sequential teeth in a band of teeth.

FIG. 11 is a magnified isometric, perspective view of a portion of the fluted cutting end portion 112 of a rotary cutting tool 100 and showing the relationship of the cutting edges on two sequential teeth 305 in a band of teeth 300. FIG. 11 is viewed in a direction perpendicular to a plane containing the longitudinal center axis of rotation 110. In the band of teeth 300 shown in FIG. 11, a first tooth 305a is separated from a second tooth 305b by a minor flute 135. In the depicted embodiment, the first tooth 305a is a leading tooth (in the direction of cutting rotation (R1) and relative to second tooth 305b). The first tooth 305a has a first cutting edge (defined by first side edge 325a) and a second cutting edge (defined by second side edge 330a) that meet at an apex 335a and the second tooth 305b has a first cutting edge (defined by first side edge 325b) and a second cutting edge (defined by second side edge 330b) that meet at an apex 335b. FIG. 11 also illustrates (in the direction of cutting rotation (R)) the overlap between the first tooth 305a, which is a leading tooth, and the second tooth 305b, which is the trailing tooth. At least a portion of the first cutting edge (defined by first side edge 325a) of the first tooth 305a axially overlaps (relative to the axial direction of the longitudinal center axis of rotation 110) at least a portion of the second cutting edge (defined by first side edge 330b) of the second tooth 305b. In FIG. 11, the overlap is illustrated as overlap (Δ). In a particular embodiment, the trailing portion 580 of the first cutting edge (defined by first side edge 325a) of the first tooth 305a axially overlaps the trailing portion 585 of the second cutting edge (defined by first side edge 330b) of the second tooth 305b. In exemplary embodiments, the overlap (Δ) is 6% to 10% of the pitch (P). When viewed in a plane perpendicular to the longitudinal center axis of rotation and intersecting two sequentially adjacent teeth of the plurality of teeth arranged in the band, i.e., in a plane located at the location of the overlap (Δ), a portion of the first cutting edge (defined by first side edge 325a) of the first tooth 305a is, relative to the direction of cutting rotation (R), in front of a portion of the second cutting edge (defined by first side edge 330b) of the second tooth 305b. The overlap (Δ) ensures there is no gap in the effective cutting edge of the tool 100 formed by the teeth 305 in the band of teeth 300 as the tool 100 rotates in the direction of cutting rotation (R1) during machining of a workpiece and provides a smooth finish on the workpiece.

Figure 12:
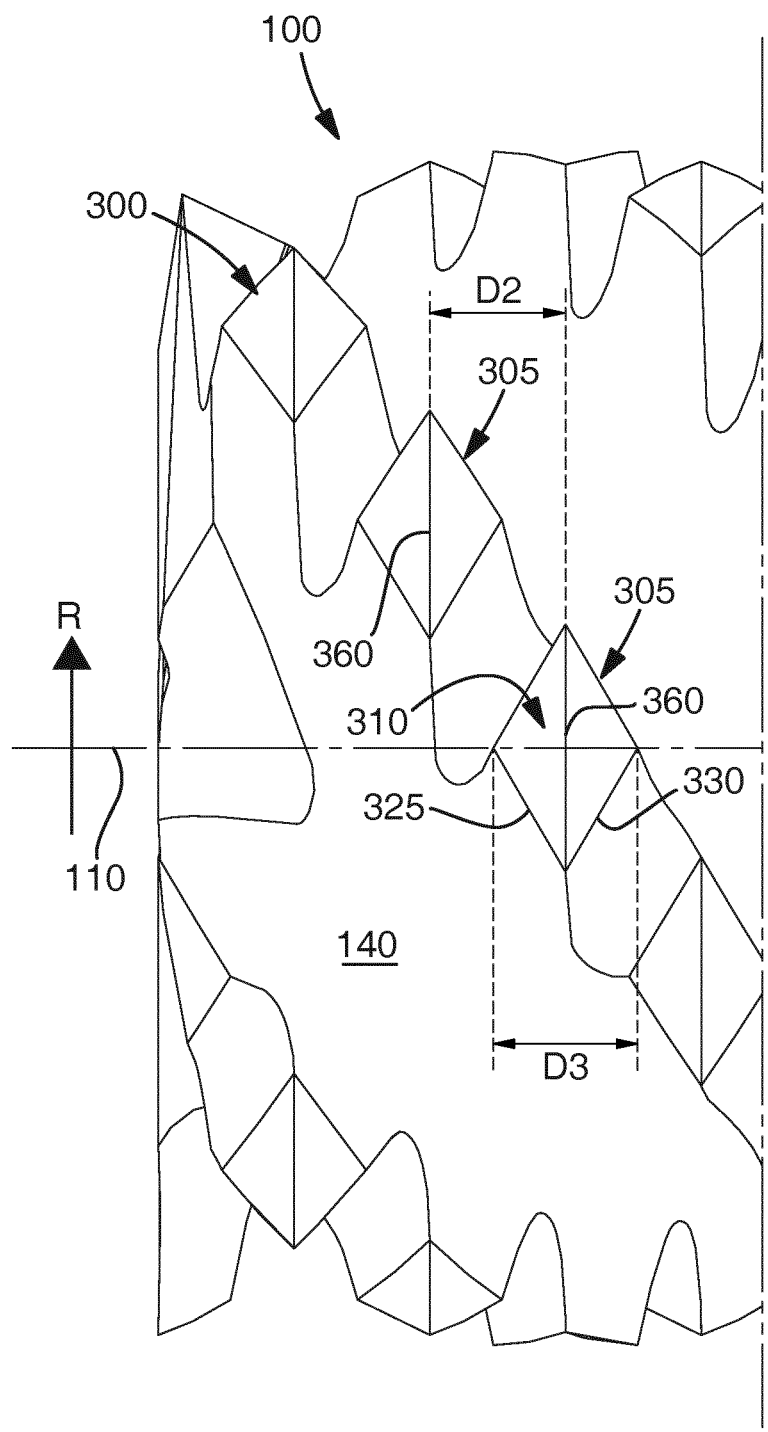
FIG. 12 is a magnified isometric, perspective view of a portion of the fluted cutting end portion of a rotary cutting tool and showing the relationship of the transition feature on two sequential teeth in a band of teeth.

FIG. 12 is a magnified isometric, perspective view of a portion of the fluted cutting end portion 112 of a rotary cutting tool 100 and showing the relationship of the transition feature 360 on two sequential teeth 305 in a band of teeth 300. FIG. 12 is the same view as shown in FIG. 11. In the band of teeth 300 shown in FIG. 12, the distance (D2) (determined parallel to the longitudinal center axis of rotation 110) between the transition features 360 of adjacent teeth 305 on one band 300 defines the pitch (P) of the teeth. Also, a greatest distance (D3) (determined parallel to the longitudinal center axis of rotation 110) between the first cutting edge (defined by first side edge 325) and the second cutting edge (defined by second side edge 330) of the face portion 310 of one of the teeth 305 defines a cutting width (W). In exemplary embodiments, the cutting width (W) is greater than the pitch (P). When the pitch (P) and the width (W) are constant for the plurality of teeth 305 in a band of teeth 300, the width (W) being larger than the pitch (P) ensures there is no gap in the effective cutting edge of the tool 100 formed by the teeth 305 in the band of teeth 300 as the tool 100 rotates in the direction of cutting rotation (R1) during machining of a workpiece.

Figure 13A:
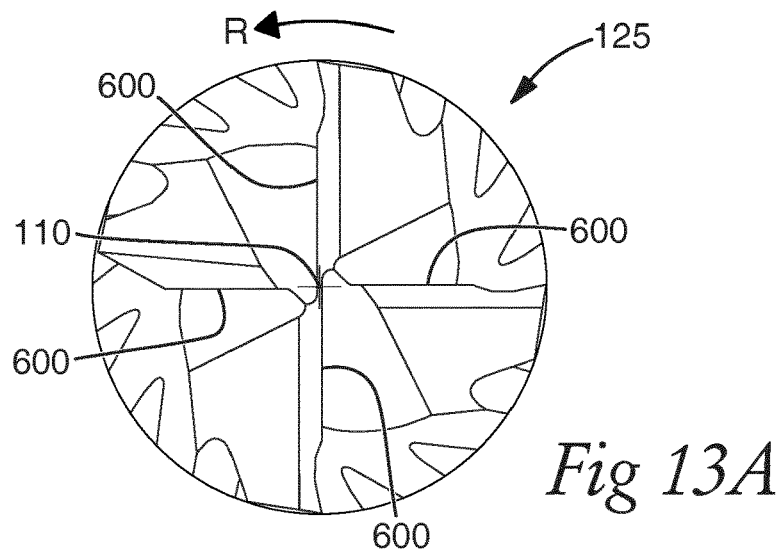
FIG. 13A is a view of the end surface of an exemplary embodiment of a rotary cutting tool as seen along the longitudinal center axis of rotation having a center cutting end mill configuration.

The end surface 125 of the rotary cutting tool 100 can have any of various forms known in the art for end mills. For example and as shown in FIG. 13A, which is a view of the end surface as seen along the longitudinal center axis of rotation 110, the end surface 125 can have a center cutting end mill configuration. In the center cutting end mil configuration, the end surface 125 in side plan view is planar (see also FIGS. 3-4 and 6) and includes end cutting edges 600. The portions of the end cutting edges 600 that are coincident with the planar end surface 125 are straight in a radial direction (see FIG. 13A).

Figure 13B:
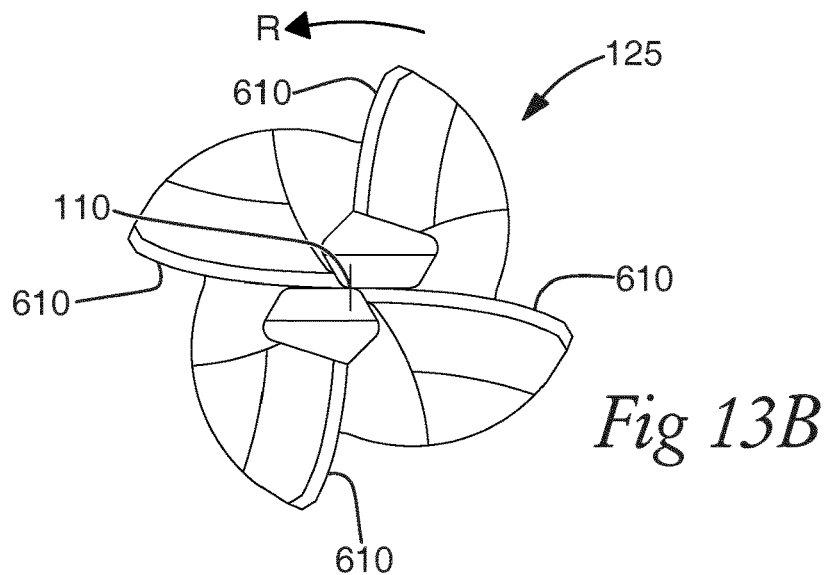
FIG. 13B is a view of the end surface of an exemplary embodiment of a rotary cutting tool as seen along the longitudinal center axis of rotation having a ball end mill configuration.

In another example and as shown in FIG. 13B, which is a view of the end surface as seen along the longitudinal center axis of rotation 110, the end surface 125 can have a ball end mill configuration with curved cutting edges 610.

Figure 13C:
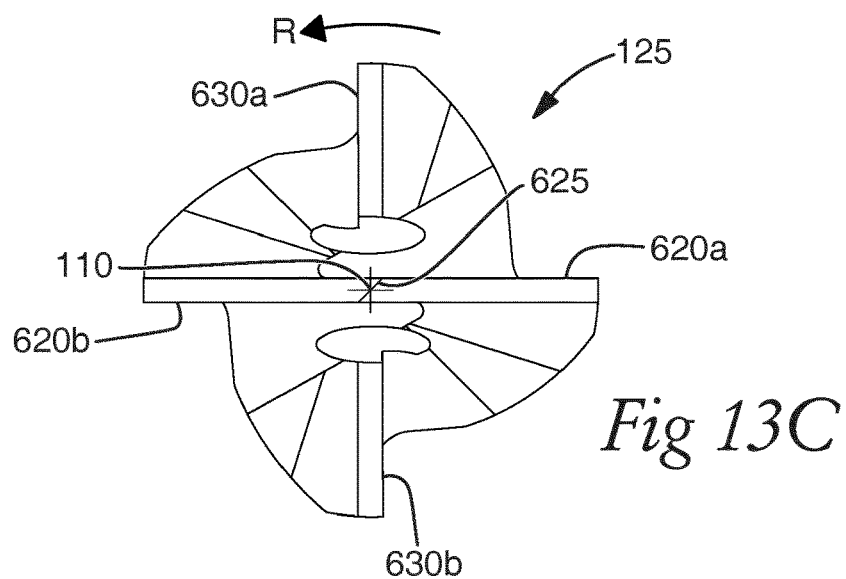
FIG. 13C is a view of the end surface of an exemplary embodiment of a rotary cutting tool as seen along the longitudinal center axis of rotation having a drill point end mill configuration.

In another example and as shown in FIG. 13C, which is a view of the end surface as seen along the longitudinal center axis of rotation 110, the end surface 125 can have a drill point end mill configuration with a first and second axially angled cutting edges 620a and 620b (typically straight cutting edges) forming the included angle of the drill point 625 and two offset angled cutting edges 630a and 630b (typically straight cutting edges).

However, the features, improvements, methods, processes and other technical details disclosed herein are also applicable to other categories and types of rotary cutting tools, such as other types of end mills, face mills, side mills, and drilling tools having a point geometry.

The rotary cutting tool can optional include a coating on surfaces of the fluted cutting end portion 112. In one aspect, the coating is on all of the surfaces of the fluted cutting end portion 112. In other aspects, the coating is on portions of the surfaces of the flutes, the cutting edges, the face portion or combinations thereof. In still further aspects, the coating is on portions including the fluted cutting end portion 112 including the major flute surfaces 140, the minor flute surfaces 145, the first cutting edge (defined by first side edge 325), the second cutting edge (defined by second side edge 330), the first region 340 (defining the relief surface of the first cutting edge), the second region 350 (defining the relief surface of the second cutting edge), or combinations of these surfaces. Furthermore, in some aspects the coating is on the surfaces along the entire axial length of the fluted cutting end portion 112, while in other aspects the coating is on the surfaces along a portion of the axial length of the fluted cutting end portion 112, such as the first 50%, alternatively first 25% of the axial length of the fluted cutting end portion 112 rearward from the end surface 125. In each of the above, the end surfaces 125 may or may not be coated.

The coating can be any suitable coating known in the arts of cutting tools. For example, the coating can be a chemical vapor deposition (CVD) coating. An example of a suitable CVD coating is polycrystalline diamonds (PCD). In another example, the coating can be a physical vapor deposition (PVD) coating. Examples of suitable physical vapor deposition coatings include diamond-like carbon (DLC), graphite, Ti(Al,N), Ti(C,N), Al(Ti,N), and Al(Cr,N). Both stoichiometric and non-stoichiometric Ti(Al,N), Ti(C,N), Al(Ti, N), and Al(Cr,N) can be used as the coating. Typically, the coatings are from 100 nm to 3 microns in thickness, alternatively, 1 micron to 2 microns in thickness.

Embodiments of the rotary cutting tool 100 may optionally have internal channels for delivery of coolant (liquid or gaseous) to the cutting area. When present, such internal channels may run internally in a longitudinal direction and helically pitched as necessary to extend from the shank portion 114 to an exit opening in the fluted cutting end portion 112, typically in the flute surfaces 140, 145 and/or in the surfaces of the end surface 125.

Additionally, the features disclosed and described herein and shown in the figures are typically implemented in solid body rotary cutting tools, in which the flutes and teeth (and associated features including the cutting edges and the geometry of the face portion) are formed integrally with the tool body. However, the flutes and teeth (and associated features including the cutting edges and the geometry of the face portion) may also be implemented in tools utilizing removable cutting inserts.

Figure 14:
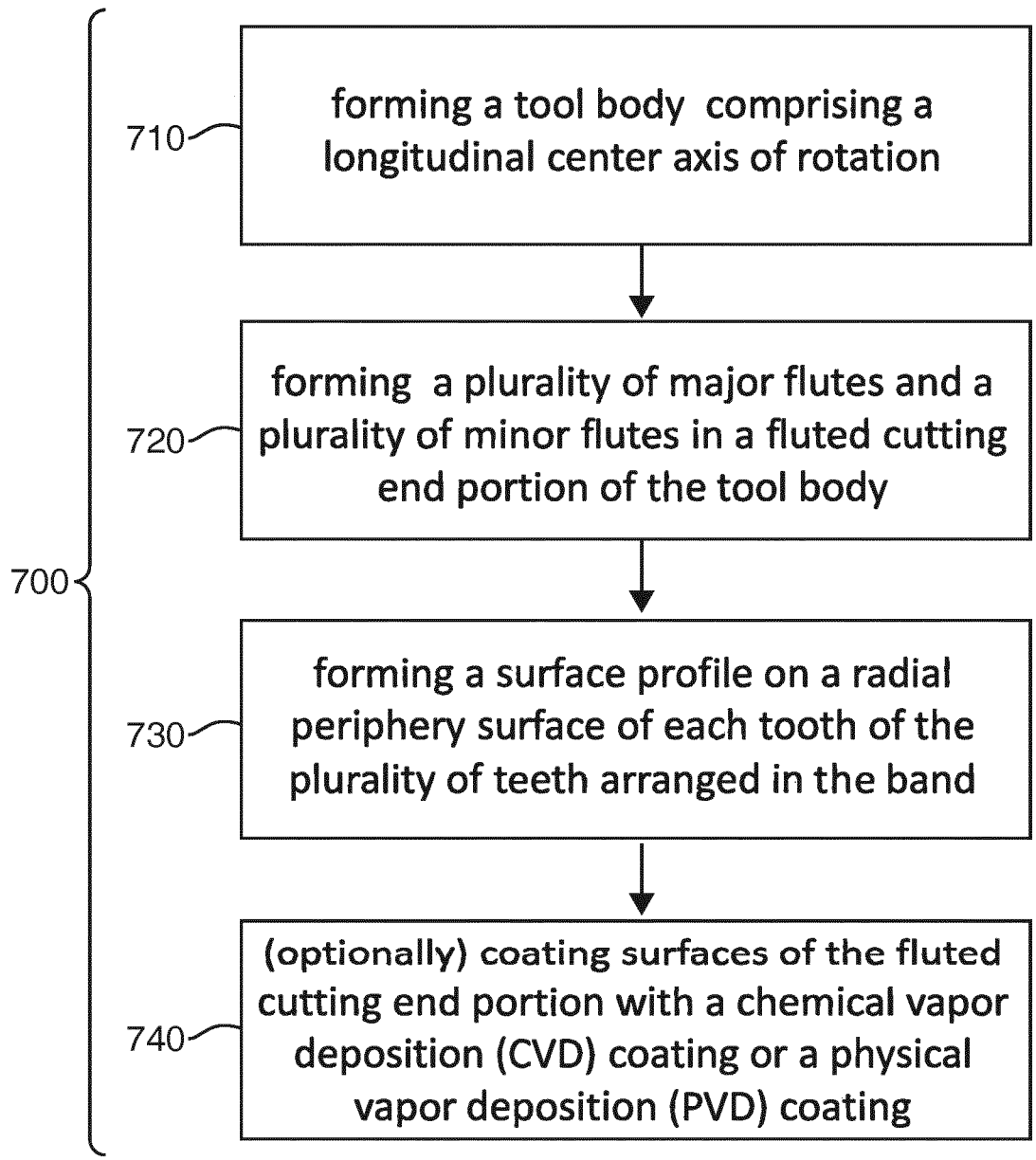
FIG. 14 shows steps in a method of manufacturing an embodiment of the disclosed cutting tool.

FIG. 14 shows steps in a method of manufacturing an embodiment of the disclosed cutting tool. The method 700 illustrated in FIG. 14 includes 710 forming a tool body 105 comprising a longitudinal center axis of rotation 110. As disclosed herein, the tool body 105 is elongated and rotatable along the longitudinal center axis of rotation 110. In some aspects, a blank of the tool body is formed as a solid body of hard material by consolidating hard materials, such as tungsten-cemented carbide (WC) or tungsten carbide cobalt (WC-Co) and with or without carbide particles such as titanium carbide (TiC) or tantalum carbide (TaC). Other materials can be used for the tool body, such as tool steel, high-speed steel, and ceramics.

Subsequent to forming the blank of the tool body 105, the plurality of major flutes 130 and a plurality of minor flutes 135 are 720 formed in a fluted cutting end portion 112 of the blank. In some embodiments of the method 700, the solid body of the blank can be formed as a rod, in which case a plurality of major flutes 130 and a plurality of minor flutes 135 are formed in a fluted cutting end portion 112 of the tool body 105 by suitable material removal means, such as by grinding and/or polishing. It is also contemplated that additive manufacturing methods can be applied to manufacture a rough form of the tool, which would then be final machined to a final form, such as by grinding and/or polishing.

Grinding can be by any suitable technique, such as with CBN, aluminum oxide and diamond grinding wheels, and is generally assisted by computer controlled positioning and translating equipment. The machining removes material of the helical flutes (both major flutes and minor flutes) to have the selected values of helix angle ($\alpha$) and helix angle ($\beta$) and to produce the teeth having the selected values of apex angle ($\phi$) and rake angles ($\gamma$) and ($\varepsilon$), all within the ranges disclosed herein (and considering manufacturing tolerances).

For the removable cutting insert rotary cutting tool, a blank of the tool body is made by any suitable techniques, including for example those discussed above for the solid body rotary cutting tool. The blank has the general elongate form of the tool body and includes helically extending flutes. Seating pockets for removable indexable cutting inserts are formed in the band of teeth. The seating pockets are correspondingly sized, spaced and oriented to accommodate the intended removable indexable cutting insert at the desired orientation for the various associated features and surfaces of the tooth, including the first side edge 325 and the second side edge 330 meeting to form the apex 335 and the features of the face portion 310, all of which are formed on the removable indexable cutting insert.

It is also contemplated that a rotary cutting tool could implement a combination of features formed integrally with the tool body and features formed on the removable indexable cutting insert, which is then mounted in a seating pocket on the rotary cutting tool.

In other embodiments of the method 700, the solid body of the tool body 105 can be directly formed (at least in rough form) using powder metallurgy techniques, in which case a plurality of major flutes 130 and a plurality of minor flutes 135 (having one or more of the various features disclosed herein) are formed in a fluted cutting end portion 112 of the tool body 105 by the molding process utilized in the powder metallurgy process. In some instances, the flutes formed using powder metallurgy techniques are subsequently finished by grinding or other technique to obtain the final dimensions and surface finish.

After the flute profiles of the tool body have been formed, the surface profile is 730 formed on a radial periphery surface of each tooth 305 of the plurality of teeth arranged in the band 300. This surface profile defines a face portion 310 having one or more of the various features disclosed herein.

Figure 15:
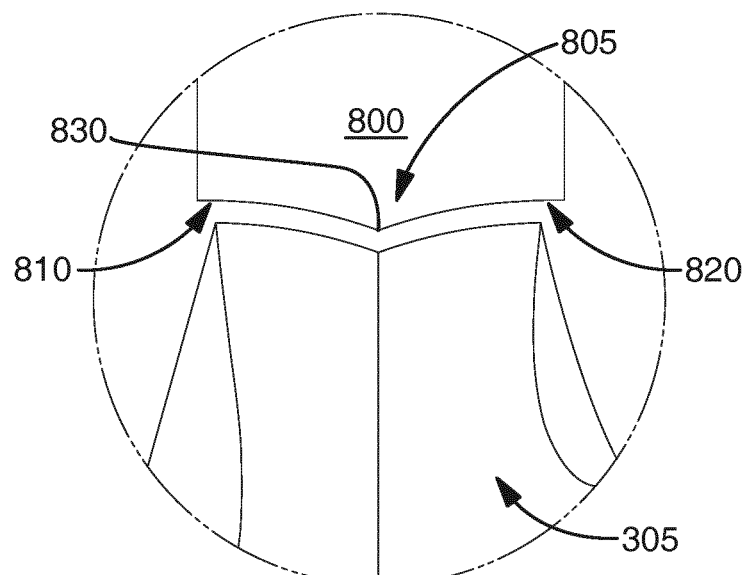
FIGS. 15 and 16 schematically illustrate aspects of a grinding process that can be used to form a surface profile on a radial periphery surface of each tooth of the plurality of teeth arranged in the band and that defines a face portion.
Figure 16:
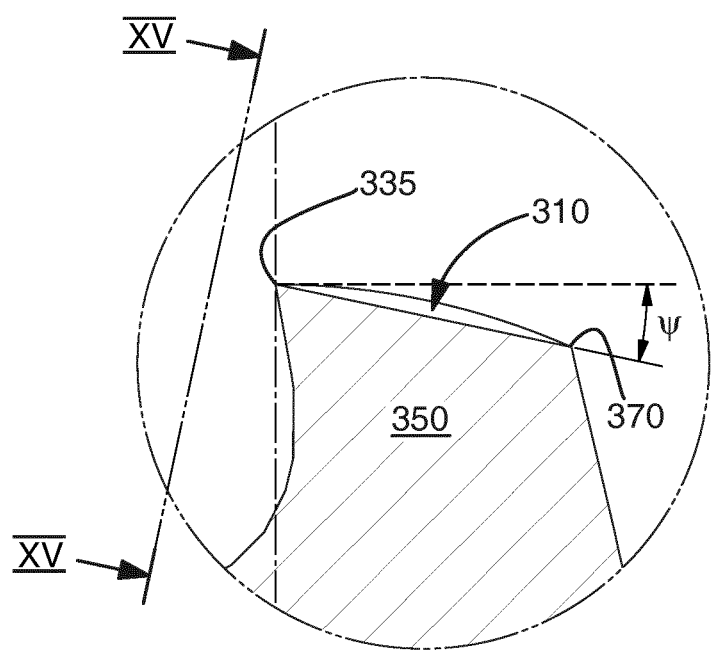

In one embodiment, the surface profile is formed by grinding. FIGS. 15 and 16 schematically illustrate aspects of a grinding process that can be used to form a surface profile on a radial periphery surface of each tooth of the plurality of teeth arranged in the band. As illustrated schematically in FIG. 15, a grinding wheel 800 having a grinding form 805 is brought into rotational contact with a surface to be ground on the radial periphery surface of the tooth. The grinding form, the tool body or both may be rotated to affect the rotation for the rotational contact. The grinding form 805 has a cross-sectional profile that is the negative of the desired surface profile of the first region 340 of the face portion 310 and the second region 350 of the face portion 310 that define the respective relief surfaces of the first cutting edge and the second cutting edge. In the illustrated example, the grinding form 805 has a cross-sectional profile that includes a first concave surface 810 and a second concave surface 820 that meet at a ridge 830. During grinding operations, the ridge 830 is typically aligned with the apex 335 of the quadrilateral-shaped face portion 310. As the ridge 830 forms the transition feature 360, one also performs the grinding so that the transition feature 360 is formed in the desired location and orientation relative to the features of the face portion 310, such as the side edges 325, 330, 380, 385 and the trailing apex 370.

FIG. 16 is a side cross-sectional view of the face portion 310 of a tooth 305 showing the leading apex 335, transition feature 360, trailing apex 370 and cutting edge of the tooth. As seen in FIG. 16, the face portion 310 is at a radial relief angle ($\psi$) of 15±1 degree.

The method 700 also includes optionally coating surfaces of the fluted cutting end portion 120 with a chemical vapor deposition (CVD) coating or a physical vapor deposition (PVD) coating, as disclosed herein.

Embodiments of the disclosed rotary cutting tool can be used in machining operations to remove material from a workpiece. For example, embodiments of the disclosed rotary cutting tool can be mounted to a spindle of an apparatus for machining, such as a machine tool or a computer numerical control (CNC) machine. Typically, the shank portion 114 would be clamped or otherwise secured to the spindle for axial rotation of the rotary cutting 100 about the longitudinal center axis of rotation 110. The mounted rotary cutting tool 100 is then rotated and material of a workpiece is removed by contacting the cutting edges, i.e., the first cutting edge (defined by first side edge 325) and the second cutting edge (defined by second side edge 330), to the workpiece. Typically, during machining, the apex 335 makes first contact with the workpiece. Alternatively, the rotary cutting tool with the above described radial cutting edge (and its associated features including one or more of the tooth pattern and the rake face surface) can be mounted in a stationary position in an apparatus for machining and the workpiece can be positioned, moved, and/or rotated and contacted to the radial cutting edge to remove material from the workpiece. The workpiece may be a metal material, which may be ferrous or nonferrous, a metal alloy material, a natural or a synthetic material, or a composite of two or more different materials. In specific embodiments, the workpiece is a fiber reinforced composite, such as a carbon fiber reinforced plastic (CRFP) or a glass fiber reinforced plastic (GFRP). The geometries for helix angles ($\alpha$, $\beta$), radial rake angles ($\gamma$, $\varepsilon$), the arc ($\theta$) and the apex angle ($\phi$) will typically vary based on, at least in part, the properties of the material to be machined, and will result in varying tooth geometries. These geometries can be adjusted based on, for example, the number of fiber layers, the directions of the fibers, and the stacked combinations of layers and materials, such as laminates of aluminum or aramid outer layers.

Figure 17A:
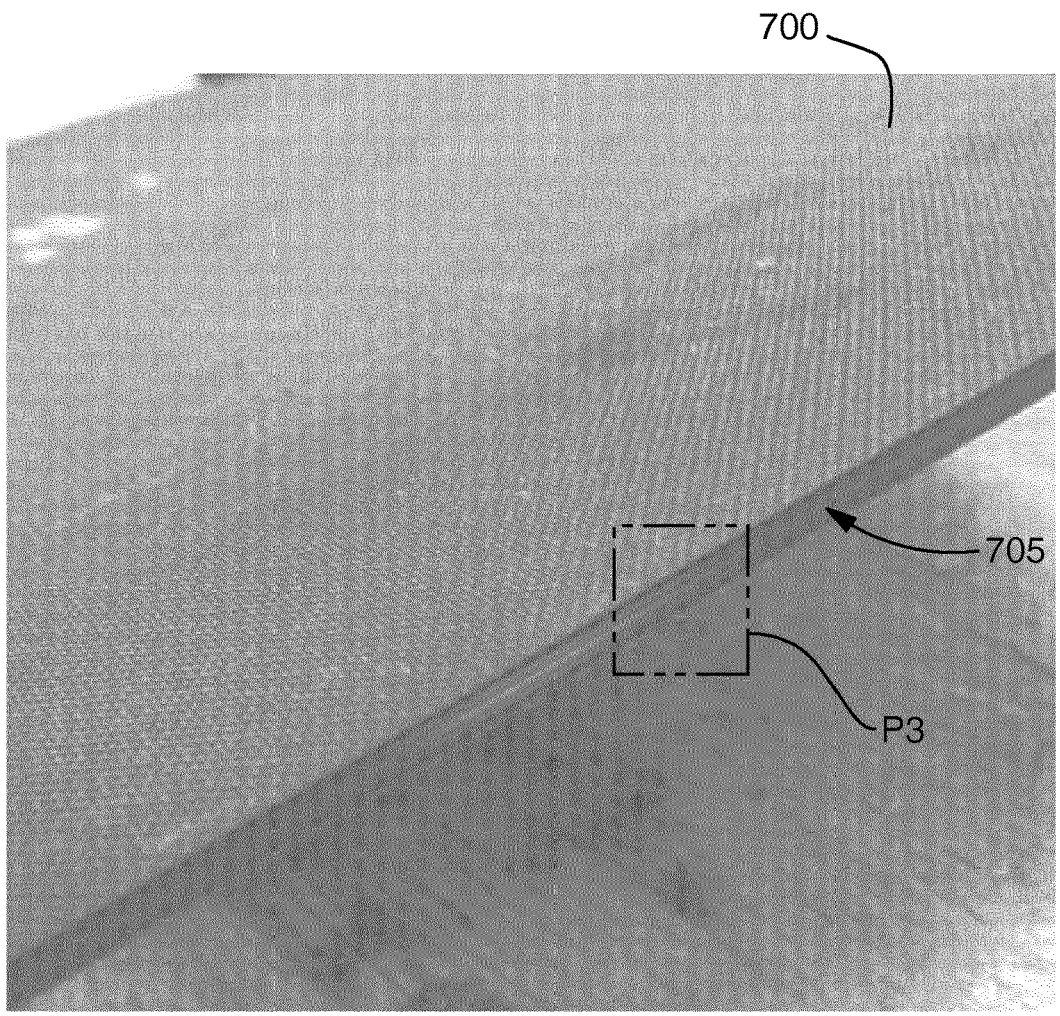
FIG. 17A shows a workpiece of carbon reinforce composite material with an that has been machined by a rotary cutting tool according to an embodiment and FIG. 17B show a magnified view of a portion of the machined edge.
Figure 17B:
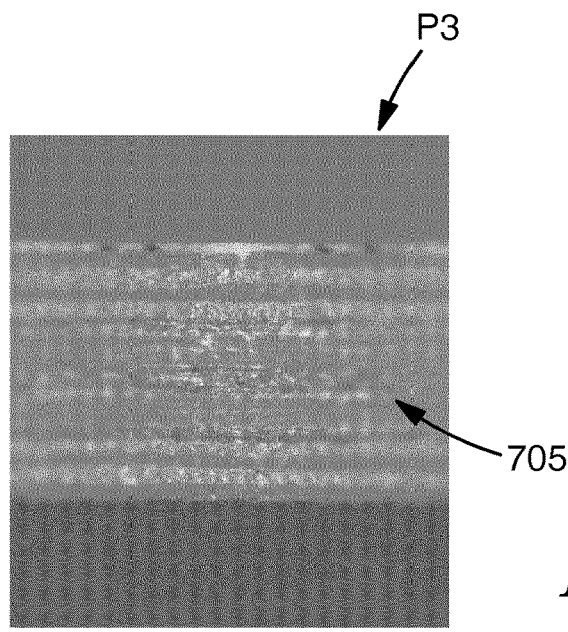

As an example, embodiments of the disclosed rotary cutting tool can be used in machining operations to remove material from a workpiece of carbon reinforce composite material. FIG. 17A shows a workpiece 700 of carbon fiber reinforced plastic (CRFP) that has been machined by a rotary cutting tool according to a disclosed embodiment. The workpiece 700 has been machined by milling edge 705 by a center cutting end mill having right-handed major flutes and left-handed minor flutes. FIG. 17B show a magnified view of a portion of the machined edge 705 corresponding to portion P3 in FIG. 17A. As seen in the magnified view, there is no indication of delamination or fracturing of the layers, nor fiber pullout or un-sheared fibers.

Examples: The following information in Table 1 described embodiments of cutting tools manufactured consistent with embodiments disclosed herein:

TABLE 1

| Example | Ex. A |
|---|---|
| Tool diameter | 10 mm |
| Tool length | 75 mm |
| Major Flute Type/Minor Flute Type | RH/LH |
| Helix angle ($\alpha$) | 60 degrees |
| Helix angle ($\beta$) | 60 degrees |
| Apex angle ($\phi$) | 60 degrees |
| Radial rake angle ($\gamma$) | 10 degrees |
| Radial rake angle ($\varepsilon$) | 10 degrees |
| Overlap ($\Delta$) | 0.086 mm |
| Pitch (P) | 1.08 mm |

As previously noted, the disclosed rotary cutting tool can be embodied in rotary cutting tools in which the continuous major flutes are right-handed and the discontinuous minor flutes are left-handed or in rotary cutting tools in which the continuous major flutes are left-handed and the discontinuous minor flutes are right-handed. In embodiments in which the continuous major flutes are right-handed and the discontinuous minor flutes are left-handed (see, for example, FIGS. 1A and 1B), the major flute is a right-hand flute and the minor flute is a left-hand flute and the first cutting edge is a right-hand cutting edge and the second cutting edge is a left-hand cutting edge. In embodiments in which the continuous major flutes are left-handed and the discontinuous minor flutes are right-handed (see, for example, FIGS. 2A and 2B), the major flute is a left-hand flute and the minor flute is a right-hand flute and the first cutting edge is a left-hand cutting edge and the second cutting edge is a right-hand cutting edge. All of the above features disclosed with respect to embodiments of the rotary cutting tool having continuous right-handed major flutes and discontinuous left-handed minor flutes can be present, alone or in combination, in embodiments of the rotary cutting tool having continuous left-handed major flutes and discontinuous right-handed minor flutes.

Although the present invention has been described in connection with embodiments thereof, it will be appreciated by those skilled in the art that additions, deletions, modifications, and substitutions not specifically described may be made without departure from the spirit and scope of the invention as defined in the appended claims.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A rotary cutting tool, comprising:
   a tool body having a longitudinal center axis of rotation, the tool body being elongated and rotatable along the longitudinal center axis of rotation;
   a fluted cutting end portion and a shank portion that is axially opposite the fluted cutting end portion, the fluted cutting end portion including a radial periphery surface and an end surface;
   a plurality of major flutes located in the fluted cutting end portion, each major flute including a major flute surface projecting radially inward into the tool body and extending continuously and helically in an axial direction of the tool body; and
   a plurality of minor flutes located in the fluted cutting end portion, each minor flute including a minor flute surface projecting radially inward into the tool body and having a plurality of discontinuous minor flute surface portions that collectively extend helically in the axial direction of the tool body,
   wherein two sequentially adjacent major flutes are separated from each other by a plurality of teeth arranged in a band and individual teeth of the plurality of teeth in the band are separated from each other by a first discontinuous minor flute surface portion of a first minor flute and a second discontinuous minor flute surface portion of a second minor flute, the first minor flute sequentially adjacent the second minor flute,
   wherein the radial periphery surface of each tooth of the plurality of teeth arranged in the band defines a face portion, the face portion having a periphery including a first side edge and a second side edge meeting to form an apex, the apex oriented with the two side edges opening opposite to a direction of cutting rotation of the rotary cutting tool,
   wherein the first side edge of the face portion is formed by an intersection of the face portion with the flute surface of a first major flute, the first side edge defining a first cutting edge,
   wherein the second side edge of the face portion is formed by an intersection of the face portion with the first discontinuous minor flute surface portion of the first minor flute, the second side edge defining a second cutting edge,
   wherein a first region of the face portion extending from the first cutting edge toward an interior region of the face portion is non-planar and defines a relief surface of the first cutting edge, and
   wherein a second region of the face portion extending from the second cutting edge toward the interior region of the face portion is non-planar and defines a relief surface of the second cutting edge.

2. The rotary cutting tool of claim 1, wherein the relief surface of the first cutting edge and the relief surface of the second cutting edge are non-coplanar and meet at a transition feature.

3. The rotary cutting tool as in claim 1, wherein the first cutting edge, the second cutting edge, and the apex are located on a surface of an imaginary cylinder having a center axis that coincides with the longitudinal center axis of rotation.

4. The rotary cutting tool of claim 3, wherein all other portions of the face portion are radially inward of the surface of the imaginary cylinder.

5. The rotary cutting tool according to claim 1, wherein, in a cross-section through the fluted cutting end portion and perpendicular to the longitudinal center axis of rotation, an arc length of the major flutes is greater than an arc length of the minor flutes.

6. The rotary cutting tool according to claim 1, wherein, in a cross-section through the relief surface of the first cutting edge and perpendicular to the transition feature, the relief surface of the first cutting edge includes a curved surface having a first radius, wherein, in a cross-section through the relief surface of the second cutting edge and perpendicular to the transition feature, the relief surface of the second cutting edge includes a curved surface having a second radius, and wherein a length of the first radius and a length of the second radius are the same.

7. The rotary cutting tool according to claim 1, wherein a helix angle ($\alpha$) of each major flute has an absolute value of $45° \leq |\alpha| \leq 70°$, alternatively $59° \leq |\alpha| \leq 61°$.

8. The rotary cutting tool according to claim 1, wherein a helix angle ($\beta$) of each minor flute has an absolute value of $45° \leq |\beta| \leq 70°$, alternatively $59° \leq |\beta| \leq 61°$.

9. The rotary cutting tool according to claim 8, wherein the absolute value of the helix angle ($\alpha$) of each major flute and the absolute value of the helix angle ($\beta$) of each minor flute are the same.

10. The rotary cutting tool according to claim 1, wherein each major flute has a positive radial rake angle ($\gamma$) of $9° \leq \gamma \leq 11°$, alternatively $\gamma=10°$.

11. The rotary cutting tool according to claim 1, wherein each minor flute has a positive radial rake angle ($\varepsilon$) of $9° \leq \varepsilon \leq 11°$, alternatively $\varepsilon=10°$.

12. The rotary cutting tool according to claim 1, wherein a distance between the transition feature of adjacent teeth on one band determined parallel to the longitudinal center axis of rotation defines a pitch, wherein a greatest distance between the first cutting edge and the second cutting edge of the face portion of one of the adjacent teeth defines a cutting width, and wherein the cutting width is greater than the pitch.

13. The rotary cutting tool according to claim 1, wherein the periphery of the face portion has a shape of a quadrilateral, a parallelogram, or a rhombus.

14. The rotary cutting tool according to claim 1, wherein every tooth in one of the plurality of bands has an identical geometry.

15. The rotary cutting tool according to claim 1, wherein a radial depth of the major flutes is greater than a radial depth of the minor flutes.

16. The rotary cutting tool according to claim 1, wherein the major flute is a right-hand flute and the minor flute is a left-hand flute.

17. A method to remove material from a fiber reinforced composite workpiece, the method comprising:
rotating the rotary cutting tool according to claim 1, the rotary cutting tool mounted to a spindle of an apparatus for machining; and
removing material from the workpiece by contacting the first cutting edge and the second cutting edge to the workpiece.

18. The method according to claim 17, wherein the fiber reinforced composite is a carbon fiber reinforced plastic or a glass fiber reinforced plastic.

* * * * *